US012296849B2

(12) United States Patent
Patel et al.

(10) Patent No.: US 12,296,849 B2
(45) Date of Patent: May 13, 2025

(54) METHOD AND SYSTEM FOR FEASIBILITY-BASED OPERATION OF AN AUTONOMOUS AGENT

(71) Applicant: May Mobility, Inc., Ann Arbor, MI (US)

(72) Inventors: Sajan Patel, Ann Arbor, MI (US); Ahmed Elshaarany, Ann Arbor, MI (US); Mitesh Agrawal, Ann Arbor, MI (US); Alan Heirich, Ann Arbor, MI (US); Edwin B. Olson, Ann Arbor, MI (US)

(73) Assignee: May Mobility, Inc., Ann Arbor, MI (US)

( * ) Notice: Subject to any disclaimer, the term of this patent is extended or adjusted under 35 U.S.C. 154(b) by 0 days.

(21) Appl. No.: 18/073,209

(22) Filed: Dec. 1, 2022

(65) Prior Publication Data

US 2023/0174103 A1    Jun. 8, 2023

Related U.S. Application Data

(60) Provisional application No. 63/285,238, filed on Dec. 2, 2021.

(51) Int. Cl.
*B60W 60/00* (2020.01)
*B60W 40/04* (2006.01)
*B60W 50/00* (2006.01)

(52) U.S. Cl.
CPC ........ *B60W 60/0011* (2020.02); *B60W 40/04* (2013.01); *B60W 50/0097* (2013.01);
(Continued)

(58) Field of Classification Search
CPC ........ B60W 60/0011; B60W 60/0027; B60W 40/04; B60W 50/0097; B60W 2556/10; B60W 2050/0008; B60W 2050/0028
See application file for complete search history.

(56) References Cited

U.S. PATENT DOCUMENTS 5,544,282 A    8/1996 Chen et al.
6,199,013 B1    3/2001 Oshea
(Continued)

FOREIGN PATENT DOCUMENTS

JP    2011100492 A    5/2011
JP    2015083417 A    4/2015
(Continued)

OTHER PUBLICATIONS

A. G. Cunningham, E. Galceran, R. M. Eustice and E. Olson, "MPDM: Multipolicy decision-making in dynamic, uncertain environments for autonomous driving," 2015 IEEE International Conference on Robotics and Automation (ICRA), Seattle, WA, USA, 2015, pp. 1670-1677, doi: 10.1109/ICRA.2015.7139412. (Year: 2015).*

(Continued)

*Primary Examiner* — Naeem Taslim Alam
(74) *Attorney, Agent, or Firm* — Jeffrey Schox; Diana Lin

(57) ABSTRACT

The method can include: receiving a set of inputs; determining a set of policies based on the set of inputs; determining a set of scores associated with the set of environmental policies; and evaluating the set of policies. Additionally or alternatively, the method can include operating the ego agent according to a selected policy and/or any other processes. The method functions to facilitate scoring of policies based on 'feasibility' for agents in an environment. Additionally or alternatively, the method can function to facilitate autonomous operation of a vehicle (e.g., based on policy-feasibility of agents in the environment). Additionally or alternatively, the method can function to facilitate intention estimation for agents in an environment.

18 Claims, 12 Drawing Sheets

(52) U.S. Cl.
CPC . *B60W 60/0027* (2020.02); *B60W 2050/0008* (2013.01); *B60W 2050/0028* (2013.01); *B60W 2556/10* (2020.02)

(56) References Cited

U.S. PATENT DOCUMENTS

| | | | |
|---|---|---|---|
| 8,949,016 B1* | 2/2015 | Ferguson | B60W 50/0097 340/436 |
| 9,129,519 B2 | 9/2015 | Aoude et al. | |
| 9,274,525 B1 | 3/2016 | Ferguson et al. | |
| 9,368,026 B1 | 6/2016 | Herbach et al. | |
| 9,495,874 B1 | 11/2016 | Zhu et al. | |
| 9,618,938 B2 | 4/2017 | Olson et al. | |
| 9,646,428 B1 | 5/2017 | Konrardy et al. | |
| 9,720,412 B1 | 8/2017 | Zhu et al. | |
| 9,811,760 B2 | 11/2017 | Richardson et al. | |
| 9,914,452 B1 | 3/2018 | Ferguson et al. | |
| 10,012,981 B2 | 7/2018 | Gariepy et al. | |
| 10,156,848 B1 | 12/2018 | Konrardy et al. | |
| 10,235,882 B1 | 3/2019 | Aoude et al. | |
| 10,248,120 B1 | 4/2019 | Siegel et al. | |
| 10,386,856 B2 | 8/2019 | Wood et al. | |
| 10,518,770 B2 | 12/2019 | Kroop et al. | |
| 10,518,783 B2 | 12/2019 | Tanimichi et al. | |
| 10,540,892 B1 | 1/2020 | Fields et al. | |
| 10,558,224 B1 | 2/2020 | Lin et al. | |
| 10,564,641 B2 | 2/2020 | Vozar et al. | |
| 10,564,643 B2 | 2/2020 | Lui et al. | |
| 10,571,916 B2 | 2/2020 | Tschanz et al. | |
| 10,586,254 B2 | 3/2020 | Singhal | |
| 10,599,155 B1 | 3/2020 | Konrardy et al. | |
| 10,614,709 B2 | 4/2020 | Vozar et al. | |
| 10,642,276 B2 | 5/2020 | Huai | |
| 10,654,476 B2 | 5/2020 | Wray et al. | |
| 10,671,076 B1 | 6/2020 | Kobilarov et al. | |
| 10,796,581 B2 | 10/2020 | Herbach et al. | |
| 10,860,019 B2 | 12/2020 | Censi et al. | |
| 10,969,470 B2 | 4/2021 | Voorheis et al. | |
| 11,086,318 B1 | 8/2021 | Davis et al. | |
| 11,087,200 B2 | 8/2021 | Olson et al. | |
| 11,192,545 B1* | 12/2021 | Russell | B60W 30/182 |
| 11,242,054 B2 | 2/2022 | Isele | |
| 11,260,855 B2 | 3/2022 | Zhang | |
| 11,300,957 B2 | 4/2022 | Wray et al. | |
| 11,352,023 B2 | 6/2022 | Fairley et al. | |
| 11,396,302 B2 | 7/2022 | Ye et al. | |
| 11,565,717 B2 | 1/2023 | Kothbauer et al. | |
| 11,858,536 B1* | 1/2024 | Liu | G06N 3/0464 |
| 2002/0062207 A1 | 5/2002 | Faghri | |
| 2004/0100563 A1 | 5/2004 | Sablak et al. | |
| 2005/0004723 A1 | 1/2005 | Duggan et al. | |
| 2006/0184275 A1 | 8/2006 | Hosokawa et al. | |
| 2006/0200333 A1 | 9/2006 | Dalal et al. | |
| 2007/0193798 A1 | 8/2007 | Allard et al. | |
| 2007/0276600 A1 | 11/2007 | King et al. | |
| 2008/0033684 A1 | 2/2008 | Vian et al. | |
| 2010/0114554 A1 | 5/2010 | Misra | |
| 2010/0204867 A1 | 8/2010 | Longstaff | |
| 2011/0142283 A1 | 6/2011 | Huang et al. | |
| 2012/0089275 A1 | 4/2012 | Yao-Chang et al. | |
| 2013/0054106 A1 | 2/2013 | Schmuedderich et al. | |
| 2013/0141576 A1 | 6/2013 | Lord et al. | |
| 2013/0253816 A1 | 9/2013 | Caminiti et al. | |
| 2014/0195138 A1 | 7/2014 | Stelzig et al. | |
| 2014/0244198 A1 | 8/2014 | Mayer | |
| 2014/0309815 A1 | 10/2014 | Ricci et al. | |
| 2015/0284010 A1 | 10/2015 | Beardsley et al. | |
| 2015/0302756 A1 | 10/2015 | Guehring et al. | |
| 2015/0316928 A1 | 11/2015 | Guehring et al. | |
| 2015/0321337 A1 | 11/2015 | Stephens | |
| 2015/0344030 A1 | 12/2015 | Damerow et al. | |
| 2016/0005333 A1 | 1/2016 | Naouri | |
| 2016/0209840 A1 | 7/2016 | Kim | |
| 2016/0314224 A1 | 10/2016 | Wei et al. | |
| 2017/0031361 A1 | 2/2017 | Olson et al. | |
| 2017/0032671 A1 | 2/2017 | Toyama et al. | |
| 2017/0072853 A1 | 3/2017 | Matsuoka et al. | |
| 2017/0123419 A1 | 5/2017 | Levinson et al. | |
| 2017/0155696 A1 | 6/2017 | Dong et al. | |
| 2017/0199523 A1 | 7/2017 | Barton-Sweeney et al. | |
| 2017/0268896 A1 | 9/2017 | Bai et al. | |
| 2017/0289341 A1 | 10/2017 | Rodriguez et al. | |
| 2017/0291560 A1 | 10/2017 | Schroeder et al. | |
| 2017/0301111 A1 | 10/2017 | Zhao et al. | |
| 2017/0320500 A1 | 11/2017 | Yoo et al. | |
| 2017/0323568 A1 | 11/2017 | Inoue et al. | |
| 2017/0356748 A1 | 12/2017 | Iagnemma | |
| 2018/0011485 A1 | 1/2018 | Ferren | |
| 2018/0046182 A1 | 2/2018 | Joyce et al. | |
| 2018/0047291 A1 | 2/2018 | Konishi et al. | |
| 2018/0053102 A1 | 2/2018 | Martinson et al. | |
| 2018/0065625 A1 | 3/2018 | Tijerina et al. | |
| 2018/0070056 A1 | 3/2018 | Deangelis et al. | |
| 2018/0082596 A1 | 3/2018 | Whitlow | |
| 2018/0089563 A1 | 3/2018 | Redding et al. | |
| 2018/0100743 A1 | 4/2018 | Diaz et al. | |
| 2018/0183873 A1 | 6/2018 | Wang et al. | |
| 2018/0184352 A1 | 6/2018 | Lopes et al. | |
| 2018/0220283 A1 | 8/2018 | Condeixa et al. | |
| 2018/0224851 A1 | 8/2018 | Park | |
| 2018/0251126 A1 | 9/2018 | Linscott et al. | |
| 2018/0267550 A1 | 9/2018 | Kopetz et al. | |
| 2018/0268281 A1* | 9/2018 | Olson | G06N 7/01 |
| 2018/0281815 A1 | 10/2018 | Stentz | |
| 2018/0293537 A1 | 10/2018 | Kwok | |
| 2018/0299898 A1 | 10/2018 | Luo et al. | |
| 2018/0330481 A1 | 11/2018 | Watanabe et al. | |
| 2018/0365908 A1 | 12/2018 | Liu et al. | |
| 2018/0367997 A1 | 12/2018 | Shaw et al. | |
| 2019/0027034 A1 | 1/2019 | Xu et al. | |
| 2019/0039545 A1 | 2/2019 | Kumar et al. | |
| 2019/0066399 A1 | 2/2019 | Jiang et al. | |
| 2019/0096244 A1 | 3/2019 | Guruva Reddiar et al. | |
| 2019/0101914 A1 | 4/2019 | Coleman et al. | |
| 2019/0101919 A1 | 4/2019 | Kobilarov et al. | |
| 2019/0106117 A1 | 4/2019 | Goldberg | |
| 2019/0113919 A1 | 4/2019 | Englard et al. | |
| 2019/0113929 A1 | 4/2019 | Mukadam et al. | |
| 2019/0138007 A1* | 5/2019 | Baghsorkhi | G08G 1/16 |
| 2019/0138524 A1 | 5/2019 | Singh et al. | |
| 2019/0147610 A1 | 5/2019 | Frossard et al. | |
| 2019/0180529 A1 | 6/2019 | Smith | |
| 2019/0196465 A1 | 6/2019 | Hummelshøj | |
| 2019/0220011 A1 | 7/2019 | Della Penna | |
| 2019/0227553 A1 | 7/2019 | Kentley-Klay et al. | |
| 2019/0235516 A1 | 8/2019 | Zhang et al. | |
| 2019/0236950 A1 | 8/2019 | Li et al. | |
| 2019/0258246 A1 | 8/2019 | Liu et al. | |
| 2019/0258251 A1 | 8/2019 | Ditty et al. | |
| 2019/0265059 A1 | 8/2019 | Warnick et al. | |
| 2019/0271554 A1 | 9/2019 | Colgate et al. | |
| 2019/0271981 A1 | 9/2019 | Oba | |
| 2019/0291726 A1 | 9/2019 | Shalev-Shwartz et al. | |
| 2019/0329771 A1 | 10/2019 | Wray et al. | |
| 2019/0331758 A1 | 10/2019 | Malkes et al. | |
| 2019/0332106 A1 | 10/2019 | Belloni Mourao et al. | |
| 2019/0332110 A1 | 10/2019 | Isele et al. | |
| 2019/0337509 A1 | 11/2019 | Shalev-Shwartz et al. | |
| 2020/0004241 A1 | 1/2020 | Levinson et al. | |
| 2020/0017114 A1 | 1/2020 | Santoni et al. | |
| 2020/0020226 A1 | 1/2020 | Stenneth et al. | |
| 2020/0026286 A1 | 1/2020 | Vozar et al. | |
| 2020/0057441 A1 | 2/2020 | Wang et al. | |
| 2020/0086837 A1 | 3/2020 | Le Cornec | |
| 2020/0094850 A1 | 3/2020 | Chi et al. | |
| 2020/0097003 A1 | 3/2020 | Wray et al. | |
| 2020/0098269 A1 | 3/2020 | Wray et al. | |
| 2020/0122830 A1 | 4/2020 | Anderson et al. | |
| 2020/0124447 A1 | 4/2020 | Schwindt et al. | |
| 2020/0139967 A1* | 5/2020 | Beller | G05D 1/81 |
| 2020/0139973 A1 | 5/2020 | Palanisamy et al. | |
| 2020/0150661 A1 | 5/2020 | Vozar et al. | |
| 2020/0159227 A1 | 5/2020 | Cohen et al. | |
| 2020/0189731 A1 | 6/2020 | Mistry et al. | |

(56) References Cited

U.S. PATENT DOCUMENTS

| | | |
|---|---|---|
| 2020/0209853 A1 | 7/2020 | Leach et al. |
| 2020/0209864 A1 | 7/2020 | Chen |
| 2020/0233060 A1 | 7/2020 | Lull et al. |
| 2020/0255027 A1 | 8/2020 | Kulkarni et al. |
| 2020/0269843 A1 | 8/2020 | Wissing et al. |
| 2020/0290619 A1 | 9/2020 | Mehdi et al. |
| 2020/0293041 A1 | 9/2020 | Palanisamy |
| 2020/0294401 A1 | 9/2020 | Kerecsen |
| 2020/0298891 A1* | 9/2020 | Liang ............... G06N 5/04 |
| 2020/0309543 A1 | 10/2020 | Voznesensky |
| 2020/0339151 A1 | 10/2020 | Batts et al. |
| 2020/0346643 A1* | 11/2020 | Woon ............ B60W 60/00276 |
| 2020/0346666 A1 | 11/2020 | Wray et al. |
| 2020/0355820 A1 | 11/2020 | Zeng et al. |
| 2020/0369294 A1 | 11/2020 | Jeon et al. |
| 2020/0400781 A1 | 12/2020 | Voorheis et al. |
| 2021/0042535 A1 | 2/2021 | Abbott et al. |
| 2021/0116907 A1 | 4/2021 | Altman |
| 2021/0132606 A1 | 5/2021 | Basich et al. |
| 2021/0163021 A1 | 6/2021 | Frazzoli et al. |
| 2021/0181758 A1 | 6/2021 | Das et al. |
| 2021/0188327 A1* | 6/2021 | Otliga ............... G01C 21/3407 |
| 2021/0197864 A1 | 7/2021 | Oltmann et al. |
| 2021/0208244 A1 | 7/2021 | Voorheis et al. |
| 2021/0229697 A1 | 7/2021 | Lee et al. |
| 2021/0245785 A1 | 8/2021 | Suzuki et al. |
| 2021/0269063 A1 | 9/2021 | Lee et al. |
| 2021/0284183 A1 | 9/2021 | Marenco et al. |
| 2021/0286651 A1 | 9/2021 | Ho et al. |
| 2021/0300412 A1* | 9/2021 | Dingli ............... B60W 50/0098 |
| 2021/0339741 A1 | 11/2021 | Rezvan Behbahani et al. |
| 2021/0365701 A1 | 11/2021 | Eshet et al. |
| 2022/0076032 A1 | 3/2022 | Jain et al. |
| 2022/0081005 A1 | 3/2022 | Brown et al. |
| 2022/0114406 A1* | 4/2022 | Wyffels ............ G06F 18/24155 |
| 2022/0126878 A1 | 4/2022 | Moustafa et al. |
| 2022/0153263 A1* | 5/2022 | Hotta ............... B60W 30/0956 |
| 2022/0185325 A1 | 6/2022 | Chen et al. |
| 2022/0204010 A1 | 6/2022 | Zhu et al. |
| 2022/0388547 A1* | 12/2022 | Yangel ............... G06V 10/764 |
| 2023/0005163 A1* | 1/2023 | Kim ............... B60Q 9/008 |
| 2023/0131815 A1* | 4/2023 | Becattini ............... G06T 9/00 |
| | | 382/107 |
| 2023/0166764 A1 | 6/2023 | Johnson et al. |
| 2023/0174103 A1 | 6/2023 | Patel et al. |

FOREIGN PATENT DOCUMENTS

| | | |
|---|---|---|
| JP | 2016091039 A | 5/2016 |
| JP | 2016184276 A | 10/2016 |
| WO | 2015160900 A1 | 10/2015 |
| WO | 2021231452 A1 | 11/2021 |

OTHER PUBLICATIONS

Cunningham, A., et al., "MPDM: Multipolicy Decision-Making in Dynamic, Uncertain Environments for Autonomous Driving", Proceedings of the IEEE International Conference on Robotics and Automation (ICRA) (2015).

Mehta, D., et al., "Autonomous Navigation in Dynamic Social Environments Using Multi-Policy Decision Making", Proceedings of the IEEE/RSJ International Conference on Intelligent Robots and Systems (IROS) (2016).

Mehta, D., et al., "Fast Discovery of Influential Outcomes for Risk-Aware MPDM", Proceedings go the IEEE International Conference on Robotics and Automation (ICRA) (2017).

Neumeier Stefan, et al., "Towards a Driver Support System for Teleoperated Driving", 2019 IEEE Intelligent Transportation Systems Conference (ITSC) (Year: 2019).

Paden, B., et al., "A Survey of Motion Planning and Control Techniques for Self-driving Urban Vehicles", IEEE Transactions on Intelligent Vehicles, vol. 1, Ids. 1, (Jun. 13, 2016).

Straub, J., "Comparing The Effect of Pruning on a Best Path and a Naive-approach Blackboard Solver", International Journal of Automation and Computing (Oct. 2015).

Wuthishuwong, Chairit, et al., "Vehicle to Infrastructure based Safe Trajectory Planning for Autonomous Intersection Management", 2013 13th International Conference on ITS Telecommunications (ITST) (Year: 2013).

Crossman, Jacob, et al., "Method and System for Assessing and Mitigating Risks Encounterable by an Autonomous Vehicle", U.S. Appl. No. 18/538,312, filed Dec. 13, 2023.

* cited by examiner

METHOD AND SYSTEM FOR FEASIBILITY-BASED OPERATION OF AN AUTONOMOUS AGENT

CROSS REFERENCE TO RELATED APPLICATIONS

This application claims the benefit of U.S. Provisional Application No. 63/285,238, filed 2 Dec. 2021, which is incorporated herein in its entirety by this reference.

TECHNICAL FIELD

This invention relates generally to the autonomous vehicle field, and more specifically to a new and useful system and method for feasibility-based operation of an autonomous agent in the autonomous vehicle field.

BACKGROUND

In current systems and methods associated with the autonomous vehicle field, a major unknown—and something which can drastically affect the outcome of the autonomous vehicle taking a certain action—is how other vehicles are driving and what actions they intend to take. While the history of these neighboring vehicles and how they have been driving can provide some level of information on what actions the vehicles may be currently taking, it does not shed light onto which actions the vehicles might take in the future. This can manifest itself into the autonomous vehicle having to execute overly cautious behaviors or otherwise driving in ways which are noticeably different from human drivers on the road, leading to frustration from other drivers, inefficiencies in the autonomous vehicle reaching a destination, and the possibility of accidents occurring due to unexpected behaviors from the autonomous vehicles.

Thus, there is a need in the autonomous vehicle field to create an improved and useful system and method for feasibility-based operation of an autonomous agent. The inventors have discovered such a useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
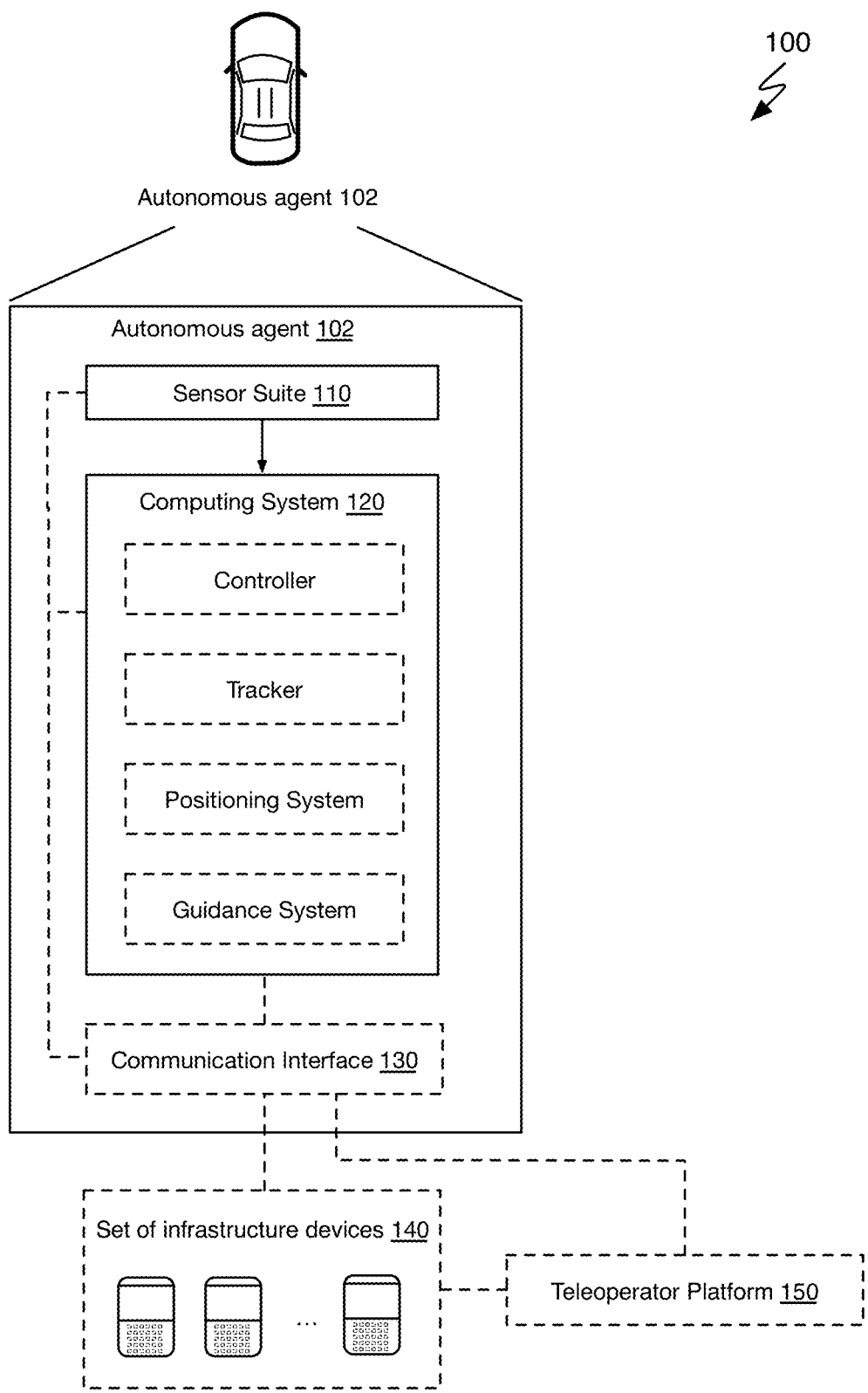
FIG. 1 is a schematic of a system for feasibility-based operation of an autonomous agent.

A system 100 for feasibility-based operation of an autonomous agent, an example of which is shown in FIG. 1, can include a computing system 120 (equivalently referred to herein as a computer). The system 100 further preferably includes and/or interfaces with the autonomous agent 102 (equivalently referred to herein as an ego agent), a sensor suite 110 (e.g., onboard the ego agent, etc.), and/or any other components. The system can optionally include or be used in conjunction with a communication interface 130; a set of infrastructure devices 140; a teleoperator platform 150; and/or any other suitable set of components. Additionally or alternatively, the system can include or all of the components as described in U.S. application Ser. No. 16/514,624, filed 17 Jul. 2019, and U.S. application Ser. No. 17/365,538, filed 1 Jul. 2021, U.S. application Ser. No. 17/550,461, filed 14 Dec. 2021, U.S. application Ser. No. 17/554,619, filed 17 Dec. 2021, U.S. application Ser. No. 17/712,757, filed 4 Apr. 2022, and/or U.S. application Ser. No. 17/826,655, filed 27 May 2022, each of which is incorporated in its entirety by this reference. The system 100 functions to facilitate (feasibility-based) intention estimation for agents in an environment and/or autonomous operation of an autonomous vehicle based on feasible policies of agents in the environment.

Figure 2:
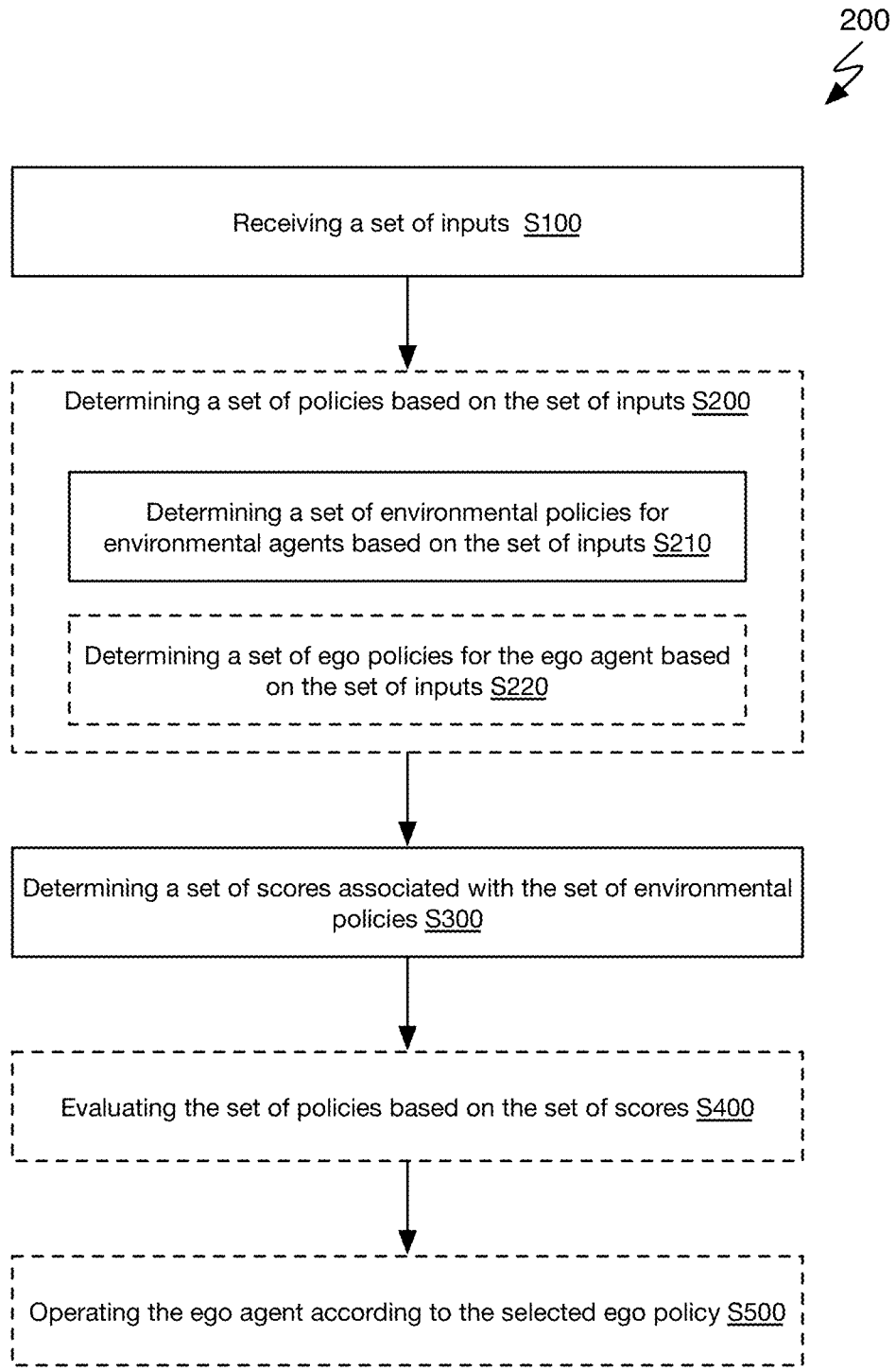
FIG. 2 is a schematic of a method for feasibility-based operation of an autonomous agent.
Figure 3:
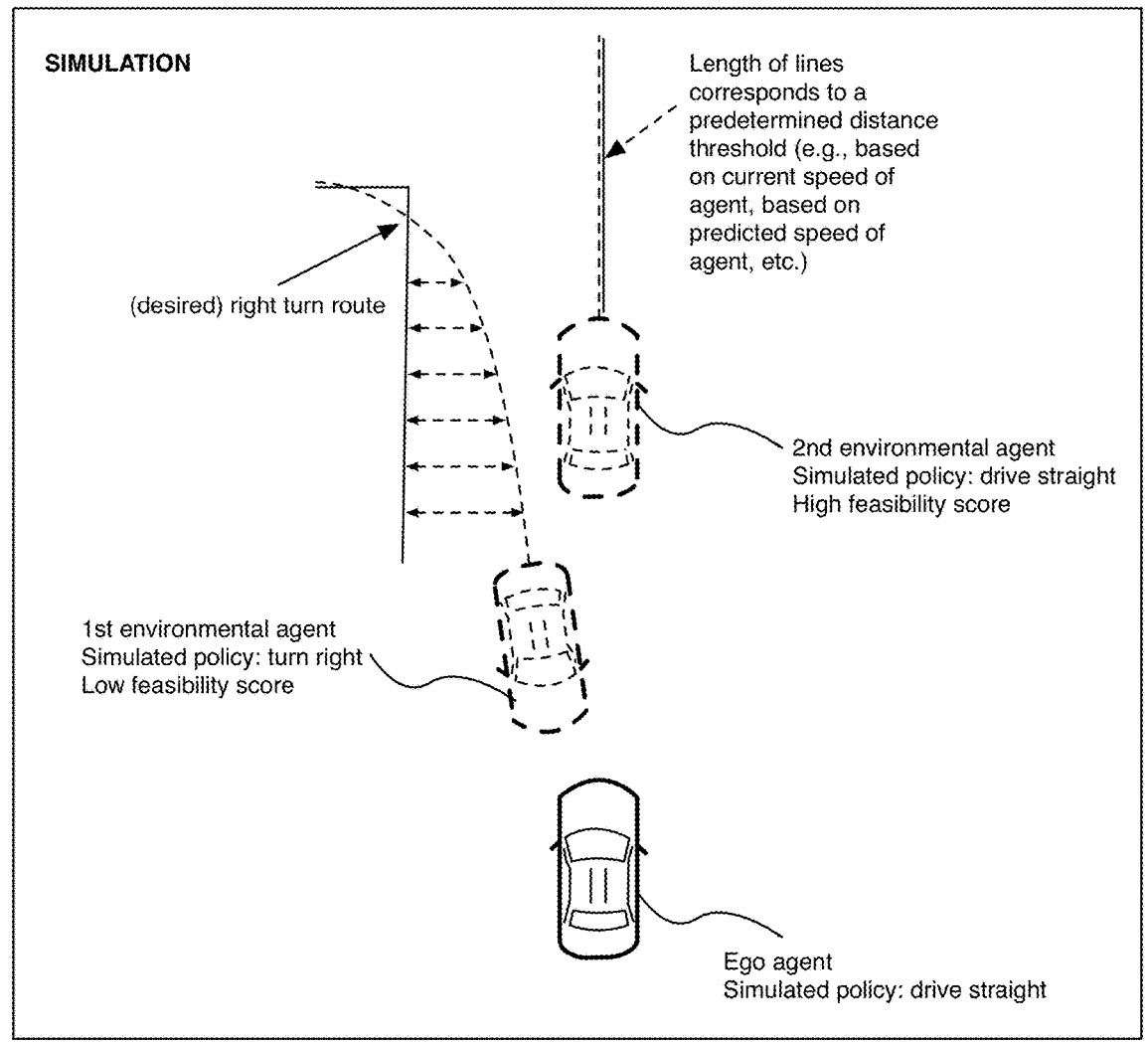
FIG. 3 is a schematic of a variation of a simulation in a method for feasibility-based operation of an autonomous agent.
Figure 3:
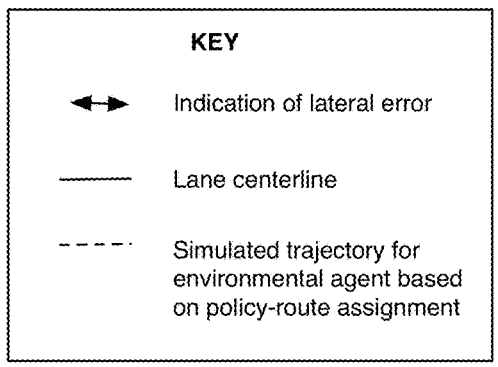

The method 200, an example of which is shown in FIG. 2, can include: receiving a set of inputs S100; determining a set of policies based on the set of inputs S200; determining a set of scores associated with the set of environmental policies S300; and evaluating the set of policies S400. Additionally or alternatively, the method 200 can include operating the ego agent according to a selected policy and/or any other processes. Further additionally or alternatively, the method 200 can include and/or interface with any or all of the methods, processes, embodiments, and/or examples as described in: U.S. application Ser. No. 16/514,624, filed 17 Jul. 2019, and U.S. application Ser. No. 17/365,538, filed 1 Jul. 2021, U.S. application Ser. No. 17/550,461, filed 14 Dec. 2021, U.S. application Ser. No. 17/554,619, filed 17 Dec. 2021, U.S. application Ser. No. 17/712,757, filed 4 Apr. 2022, and/or U.S. application Ser. No. 17/826,655, filed 27 May 2022, each of which is incorporated in its entirety by this reference. The method 200 functions to facilitate scoring of policies that are assigned to other agents in an environment of the ego agent, based on how feasible it would be for these other agents to implement said policies. Additionally or alternatively, the method 200 can function to facilitate autonomous operation of a vehicle (e.g., based on policy-feasibility of agents in the environment). Additionally or alternatively, the method 200 can function to facilitate intention estimation for agents in an environment.

In a first example, the system 100 and/or method 200 can incorporate policy feasibility for environmental agents into a multi-policy decision making (MPDM) process for an ego agent, thereby facilitating autonomous ego decision making under a variety of environmental policy scenarios (e.g., based on feasibility).

The method 200 can be performed with a system 100 as described above and/or with any other suitable system.

1.1 Illustrative Examples

In a first set of variants, a method for agents (e.g., other vehicles, pedestrians, etc.) in an environment of an autonomous vehicle, these agents equivalently referred to herein as environmental agents, includes: determining a set of inputs using a sensor suite of the autonomous vehicle, the set of inputs including an environmental agent instance identifier and a state history associated with the environmental agent instance identifier; based on the set of inputs, determining a set of environmental policies for the environmental agent instance identifier; for each environmental policy of the set: determining a historical score by a comparison of a state history of the environmental agent to a reference trajectory (i.e., intended future route fragment) associated with the environmental policy, and determining a feasibility score by a forward simulation of the environmental policy; determining an ego policy by an evaluation of a set of vehicle policies for the autonomous vehicle relative to the set of environmental policies, based on the feasibility scores and the historical scores; and operating the autonomous vehicle based on the ego policy. In a specific example, the ego vehicle policy can be determined by a multi-policy decision-making (MPDM) system, which performs (complex) simulations of agent interactions based on the respective set of scores of each policy candidate. In a specific example, the method can be a method of feasibility-based agent intention estimation for the agents in the environment. Additionally or alternatively, the ego vehicle policy can be determined in accordance with any other systems, modules, procedures, and/or protocols.

In a second set of variants, a method for operation of an autonomous vehicle relative to agents in an environment of the autonomous vehicle includes: tracking a set of agents in the environment based on vehicle sensor data, including determining a state history of each agent of the set; determining a set of policy candidates for each agent; determining a respective set of scores for each policy candidate, including: determining a first score based on a comparison between the policy candidate and the state history of the agent, and determining a second score by a forward simulation of the policy candidate; and operating the autonomous vehicle based (jointly) on the respective set of scores of each policy candidate. In a specific example, the method can additionally include: using a multi-policy decision-making (MPDM) system, determining an ego policy for the autonomous vehicle based on the respective set of scores of each policy candidate, wherein operating the autonomous vehicle comprises executing the ego policy.

2. Benefits

The system and method for operation of an autonomous agent can confer several benefits over current systems and methods.

In a first variation, the system and/or method confers the benefit of taking into account a feasibility associated with each of a set of policies which could be assigned to objects (e.g., other agents, pedestrians, animals, obstacles, etc.) in an environment of the ego agent (equivalently referred to herein as environmental objects or neighboring objects or proximal objects or environmental agents), which can be used in simulations or otherwise used to select a policy for the ego agent to implement. In specific examples, for instance, a feasibility score is determined for each of a set of policies associated with neighboring agents/objects of the ego agent, such that the feasibility of a neighboring agent/object implementing a certain policy in the future can be taken into account when selecting a policy for the ego agent to implement (equivalently referred to herein as an ego policy) as it navigates its environment.

In specific examples, the policies along with their feasibility scores are used to perform intention estimation for the environmental agents in simulations, the simulations performed in accordance with a multi-policy decision-making (MPDM) module of the ego agent.

In a second variation, additional or alternative to the first, the system and/or method confer the benefit of performing forward simulations which look into the predicted future behavior of the environmental agents, which helps inform which policies are mostly likely to be implemented by the agent and/or which policies will best help the agent meet a goal (e.g., progress toward a goal, smooth trajectories, etc.). The inventors have discovered that looking at future time steps and how the agents will behave upon electing different policy options—rather than only examining historical data which has been tracked—results in a more robust and accurate selection of the most feasible policies for the environmental agents. For instance, a policy that was feasible based on historical data might not be feasible to continue in the future, and alternatively, a policy that the vehicle might take in the future might not be directly obvious from what vehicle was doing in the past. The system and/or method can optionally take into account historical information as well (e.g., in determining a separate score, in performing the forward simulations, etc.).

In a third variation, additional or alternative to those described above, the system and/or method confers the benefit of prioritizing the most feasible policies to be evaluated in each election cycle, such that the most feasible policies are able to be simulated before a decision needs to be made by the ego agent. Additionally or alternatively, the system and/or method can confer the benefit of reducing the number of policy combinations which are tested in each election cycle of operation of the ego agent by eliminating policies which are not feasible (e.g., having a feasibility score below a predetermined threshold), thereby reducing the computational load required to evaluate these policies.

In a fourth variation, additional or alternative to those described above, the system and/or method can facilitate robust handling of uncertainty of vehicle/agent intent (estimation) in the environment.

In a fifth variation, additional or alternative to those described above, the system and/or method can simplify and/or streamline intent estimation within an (uncertain) environment by separately analyzing feasibility for each agent in the scene. For example, feasibility simulations can be considered 'feedforward' or 'open loop', as they may neglect interactions between agents in the environment (and/or the ego vehicle). Additionally, separately analyzing/ estimating agent intent may allow feasibility simulations to be parallelized and/or deterministic (e.g., even under varying degrees of environmental uncertainty); where downstream simulations, such as by an MPDM algorithm/module, may more efficiently handle complex interactions and planning.

Additionally or alternatively, the system and method can confer any other benefit(s).

3. System 100

A system 100 for feasibility-based operation of an autonomous agent, an example of which is shown in FIG. 1, can include a computing system 120 (equivalently referred to herein as a computer). The system 100 further preferably includes and/or interfaces with the autonomous agent 102 (equivalently referred to herein as an ego agent), a sensor suite 110 (e.g., onboard the ego agent, etc.), and/or any other components. The system 100 can optionally include or be used in conjunction with a communication interface iso; a set of infrastructure devices 140; a teleoperator platform 150; and/or any other suitable set of components. The system 100 functions to facilitate (feasibility-based) intention estimation for agents in an environment and/or autonomous operation of an autonomous vehicle based on feasible policies of agents in the environment.

The system 100 preferably includes and/or interfaces with (e.g., is integrated within) an autonomous vehicle (equivalently referred to herein as an autonomous agent, agent, and/or ego agent). The autonomous agent is preferably an autonomous vehicle, further preferably a fully autonomous vehicle and/or a vehicle able to be operated as a fully autonomous vehicle, but can additionally or alternatively be a semi-autonomous vehicle and/or any other vehicle.

In preferred variations, the autonomous vehicle is an automobile (e.g., car, driverless car, bus, shuttle, taxi, rideshare vehicle, truck, semi-truck, etc.). Additionally or alternatively, the autonomous vehicle can include any or all of: a watercraft (e.g., boat, water taxi, etc.), aerial vehicle (e.g., plane, helicopter, drone, etc.), terrestrial vehicle (e.g., 2-wheeled vehicle, bike, motorcycle, scooter, etc.), and/or any other suitable vehicle and/or transportation device, autonomous machine, autonomous device, autonomous robot, and/or any other suitable device.

The autonomous agent 102 preferably includes and/or interfaces with a computing system 120 which functions to process information (e.g., sensor inputs) in order to determine the trajectories executed by the vehicle. Additionally or alternatively, the computing system can function to perform any or all of the processes involved in any or all of: intent estimation, perception, prediction, localization, planning, and/or any other processes involved in operation of the autonomous agent. Additionally or alternatively, the computing system 120 can function to execute any or all portions of the method 200.

The computing system 120 preferably includes an onboard computing system arranged onboard (e.g., integrated within) the ego agent. Additionally or alternatively, the computing system can include any or all of: a remote computing system (e.g., cloud computing system, remote computing in communication with an onboard computing system, in place of an onboard computing system, etc.), a computing system integrated in a supplementary device (e.g., mobile device, user device, etc.), an edge device including mobile computing devices, and/or any other suitable computing systems and devices. In some variations, for instance, the ego agent is operable in communication with a remote or disparate computing system that may include a user device (e.g., a mobile phone, a laptop, etc.), a remote server, a cloud server, or any other suitable local and/or distributed computing system remote from the vehicle. The remote computing system can be connected to one or more systems of the autonomous agent through one or more data connections (e.g., channels), but can alternatively communicate with the vehicle system in any suitable manner.

The computing system 120 can include and/or interface with a processing system (e.g., processor or set of processors, graphical processing unit or GPU, central processing unit or CPU, or any suitable processing circuitry) and memory, but can additionally or alternatively include any other suitable components. The memory can be short term (e.g., volatile, non-volatile, random access memory or RAM, etc.) and/or long term (e.g., flash memory, hard disk, etc.) memory. In some variations, for instance, the onboard computing system functions to interact with and/or operably control any one or more of the identified components or modules described herein. In preferred variations, for instance, the onboard computing system executes computer instructions for implementing a multi-policy decisioning module. In specific examples, the processing system and memory collectively function to dynamically manage the set of policies available to the autonomous agent in the framework of a multi-policy decision making framework, such as that described in U.S. application Ser. No. 16/514,624, filed 17 Jul. 2019, which is incorporated herein in its entirety by this reference. Additionally or alternatively, the processing system and memory, and/or any other suitable components, can be used for any other suitable functions.

In specific examples, the multi-policy decision-making (MPDM) module includes a simulator module or similar machine or system that functions to estimate future (i.e., steps forward in time) behavioral policies (operations or actions) for each of the environmental agents (e.g., other vehicles in an environment of the ego agent) and/or objects (e.g., pedestrians) identified in an operating environment of the autonomous agent (real or virtual) including potential behavioral policies that may be executed by the ego agent. The simulations may be based on a current state of each agent (e.g., the current hypotheses) and/or historical actions or historical behaviors of each of the agents derived from the historical data buffer (preferably including data up to a present moment). The simulations may provide data relating to interactions (e.g., relative positions, relative velocities, relative accelerations, etc.) between projected behavioral policies of each agent and the one or more potential behavioral policies that may be executed by the autonomous agent.

The system 100 can optionally include a communication interface 130 in communication with the computing system 120, which functions to enable information to be received at (e.g., from infrastructure devices, from a remote computing system and/or remote server, from a teleoperator platform 150, from another autonomous agent or other vehicle, etc.) and transmitted from the computing system (e.g., to a remote computing system and/or remote server, to a teleoperator platform 150, to an infrastructure device 140, to another autonomous agent or other vehicle, etc.). The communication interface 130 preferably includes a wireless communication system (e.g., Wi-Fi, Bluetooth, cellular 3G, cellular 4G, cellular 5G, multiple-input multiple-output or MIMO, one or more radios, or any other suitable wireless communication system or protocol), but can additionally or alternatively include any or all of: a wired communication system (e.g., modulated powerline data transfer, Ethernet, or any other suitable wired data communication system or protocol), a data transfer bus (e.g., CAN, FlexRay), and/or any other suitable components.

The system 100 can optionally include and/or interface with a set of infrastructure devices 140 (e.g., as shown in FIG. 1), equivalently referred to herein as roadside units, which individually and/or collectively function to observe one or more aspects and/or features of an environment and collect observation data relating to the one or more aspects and/or features of the environment. The set of infrastructure devices are preferably in communication with an onboard computing system of the autonomous agent, but can additionally or alternatively be in communication with the tele-assist platform, any other components, and/or any combination.

The infrastructure devices preferably include devices in an immediate and/or close proximity or within short-range communication proximity to an operating position of an autonomous agent and can function to collect data regarding circumstances surrounding the autonomous agent and in areas proximate to a zone of operation of the autonomous agent. In some embodiments, the roadside units include one or more of offboard sensing devices including flash LIDAR, thermal imaging devices (thermal cameras), still or video capturing devices (e.g., image cameras and/or video cameras, etc.), global positioning systems, radar systems, microwave systems, inertial measuring units (IMUs), and/or any other suitable sensing devices or combination of sensing devices.

The system preferably includes and/or interfaces with a sensor suite no (e.g., computer vision system, LIDAR, RADAR, wheel speed sensors, GPS, cameras, etc.), wherein the sensor suite (equivalently referred to herein as a sensor system) is in communication with the onboard computing system and functions to collect information with which to determine one or more trajectories for the autonomous agent. Additionally or alternatively, the sensor suite can function to enable the autonomous agent operations (such as autonomous driving), data capture regarding the circumstances surrounding the autonomous agent, data capture relating to operations of the autonomous agent, detecting maintenance needs (e.g., through engine diagnostic sensors, exterior pressure sensor strips, sensor health sensors, etc.) of the autonomous agent, detecting cleanliness standards of autonomous agent interiors (e.g., internal cameras, ammonia sensors, methane sensors, alcohol vapor sensors), and/or perform any other suitable functions.

The sensor suite can include vehicle sensors onboard the autonomous agent, such as any or all of: inertial sensors (e.g., accelerometers, gyroscopes, magnetometer, IMU, INS, etc.), external antennas (e.g., GPS, cellular, Bluetooth, Wi-Fi, Near Field Communication, etc.), diagnostic sensors (e.g., engine load, tire pressure, temperature sensors, etc.), vehicle movement sensors (e.g., inertial sensors, wheel-speed sensors, encoders, resolvers, etc.), environmental sensors (e.g., cameras, time-of-flight sensors, temperature sensors, wind speed/direction sensors, barometers, etc.), guidance sensors (e.g., lidar, Radar, sonar, cameras, etc.), computer vision (CV) sensors, cameras (e.g., stereocamera, hyperspectral, multi-spectral, video camera, wide-angle, CMOS, CCD, etc.), time-of-flight sensors (e.g., Radar, Lidar, sonar, etc.), and/or any other suitable sensors. The sensor suite preferably includes sensors onboard the autonomous vehicle (e.g., Radar sensors and/or Lidar sensors and/or cameras coupled to an exterior surface of the agent, IMUs and/or encoders coupled to and/or arranged within the agent, etc.), but can additionally or alternatively include sensors remote from the agent (e.g., as part of one or more infrastructure devices, sensors in communication with the agent, etc.), and/or any suitable sensors at any suitable locations. However, the sensor suite can include any other suitable set of sensors, and/or can be otherwise suitably configured.

The system can optionally include and/or interface with a vehicle control system including one or more controllers and/or control systems, which include any suitable software and/or hardware components (e.g., processor and computer-readable storage device) utilized for generating control signals for controlling the autonomous agent according to a routing goal of the autonomous agent and selected behavioral policies and/or a selected trajectory of the autonomous agent.

In preferred variations, the vehicle control system includes, interfaces with, and/or implements a drive-by-wire system of the vehicle. Additionally or alternatively, the vehicle can be operated in accordance with the actuation of one or more mechanical components, and/or be otherwise implemented.

Additionally or alternatively, the system 100 can include and/or interface with any other suitable components.

4. Method

The method 200, an example of which is shown in FIG. 2, can include: receiving a set of inputs S100; determining a set of policies based on the set of inputs S200; determining a set of scores associated with the set of environmental policies S300; and evaluating the set of policies S400. Additionally or alternatively, the method 200 can include operating the ego agent according to a selected policy and/or any other processes. Further additionally or alternatively, the method 200 can include and/or interface with any or all of the methods, processes, embodiments, and/or examples as described in: U.S. application Ser. No. 16/514,624, filed 17 Jul. 2019, and U.S. application Ser. No. 17/365,538, filed 1 Jul. 2021, each of which is incorporated in its entirety by this reference.

The method 200 functions to assess and/or score a feasibility associated with a set of potential/candidate policies for tracked agents in the environment of the ego agent, such that this feasibility represents which policies are most likely to be implemented by these tracked agents. As such, the method preferably further functions to down-weight (equivalently referred to herein as down-scale or scale down) policies which would be infeasible for the tracked agents to implement (e.g., based on the feasibility of a 'control effort' to achieve a behavior/trajectory for the policy, would cause the agent to veer off the road, would cause the agent to collide with another agent or object, would cause the agent to approach a turn with a dangerous speed, would hinder the agent in reaching a predicting goal, etc.), such that more feasible policies can be considered first or otherwise prioritized. As a first example, a policy associated with a cornering vehicle behavior may become less 'feasible' and/or may require greater control effort (e.g., greater acceleration values, greater steering angles and/or steering forces, greater braking values, etc.) at higher speeds and/or where greater steering angles are required, up to a point where it may be impractical, or impossible, for the vehicle and/or driver to execute the maneuver. For instance, a hairpin turn at greater than 50 miles per hour may exceed the physical limitations of the vehicle/driver. As a second example, a policy associated with stopping at a stop sign (e.g., in accordance with roadway driving rules) may likewise become less feasible (and eventually unachievable) as the distance between the vehicle and the intersection approaches (or becomes smaller than) the minimum braking distance for the vehicle for the instant vehicle state, particularly with consideration for a driver reaction time (e.g., typically about 0.5 second to 1 second). Additionally or alternatively, the method 200 can function to determine any other scores and/or can perform any other suitable functions.

The method 200 is preferably performed in accordance with an MPDM framework (e.g., as described above), in which, during operation of the ego agent (e.g., at each election cycle during operation of the ego agent), a policy from a set of multiple policies is selected for the ego agent based on simulating each of the set of multiple policies and selecting a most optimal policy based on the results of these simulations. In these simulations, policy predictions are also assigned to the other agents (e.g., as determined with an intent estimation process) in the environment of the ego agent such that the behavior of these other agents and how they would interact with and/or react to the ego agent can be taken into account (e.g., through an intent estimation process) in selecting the ego policy. The agents in the environment of the ego agent can include any or all of: other vehicles (e.g., human-driven vehicles, autonomous vehicles, semi-autonomous vehicles, bicycles, motorbikes, scooters, etc.), pedestrians, animals, objects (e.g., traffic cones, construction equipment, strollers, shopping carts, trees, etc.), and/or any combination. Examples of the MPDM framework are described U.S. application Ser. No. 16/514,624, filed 17 Jul. 2019, and U.S. application Ser. No. 17/365,538, filed 1 Jul. 2021, each of which is incorporated in its entirety by this reference. Additionally or alternatively, any other MPDM framework can be implemented and/or the MPDM framework can include any other processes.

In preferred variations, for instance, the method 200 functions to assign feasibility scores to the potential policies assigned to the agents in the environment of the ego agent, such that an optimal ego policy can be selected for the ego agent.

Additionally or alternatively, the method 200 can be performed in the absence of and/or independently from a MPDM framework, and/or can be performed with any other framework(s).

The method 200 is preferably performed with a system 100 as described above, but can additionally or alternatively be performed with any other system(s).

4.1 Method—Receiving a Set of Inputs S100

The method 200 includes receiving a set of inputs S100, which functions to receive information with which to assess the ego agent and/or any agents/objects in the environment of the ego agent.

S100 is preferably performed initially in the method 200 and further preferably according to an election cycle during operation (e.g., during a trip) of the ego agent. The election cycle is preferably associated with a predetermined frequency (e.g., between once every 1-10 seconds, more than once per second, less than once every 10 seconds, etc.), but can additionally or alternatively be associated with a variable frequency and/or random intervals, performed in response to a trigger, and/or otherwise implemented. For example, the election cycle frequency can be: less than 0.1 Hz, 0.1 Hz, 1 Hz, 3 Hz, 5 Hz, 10 Hz, 15 Hz, 20 Hz, 25 Hz, 30 Hz, greater than 30 Hz, any open or closed range bounded by the aforementioned values, and/or any other suitable frequency. Additionally or alternatively, S100 can be performed in absence of an election cycle and/or at any other times during the method 200.

The inputs preferably include information which characterizes the location, class (e.g., vehicle, pedestrian, etc.), and/or motion of environmental agents being tracked by the system. Additionally or alternatively, the set of inputs can include information which characterizes the location and motion of the ego agent, features of the road or other landmarks/infrastructure (e.g., where lane lines are, where the edges of the road are, where traffic signals are and which type they are, where agents are relative to these landmarks, etc.), and/or any other information.

The inputs preferably include sensor inputs received from a sensor suite onboard the ego agent, but can additionally or alternatively include historical information associated with the ego agent (e.g., historical state estimates of the ego agent; in association with an agent instance identifier) and/or environmental agents (e.g., historical state estimates for the environmental agents; tracking data; etc.), historical feasibility/scores (e.g., from a prior iteration of S300), sensor inputs from sensor systems offboard the ego agent (e.g., onboard other ego agents or environmental agents, onboard a set of infrastructure devices, etc.), information and/or any other inputs.

S100 preferably includes pre-processing any or all of the set of inputs, which functions to prepare the set of inputs for analysis in the subsequent processes of the method 200.

Pre-processing the set of inputs can optionally include calculating state estimates for the environmental agents (and/or the ego agent) based on the set of inputs. The state estimates preferably include: location data, pose data (e.g., Earth/ego referenced pose, coordinate location, heading angle, etc.), motion data (e.g., linear motion data, such as linear velocity, acceleration, etc.; angular motion parameters, angular velocity, angular acceleration, etc.; derivatives of the aforementioned parameters, such as heading rate, jerk, etc.), a historical path, and/or any other data/parameters.

Pre-processing the set of inputs can optionally additionally or alternatively include determining one or more geometric properties/features associated with the environmental agents/objects (e.g., with a computer vision module of the computing system), such as defining a 2D geometry associated with the environmental agents (e.g., 2D geometric hull, 2D profile(s), outline of agent, etc.), a 3D geometry associated with the environmental agent, and/or any other geometries. This can be used, for instance, to determine (e.g., during S100 and/or in other processes of the method 200, along with a position or other part of the state estimate, etc.) what lane or lanes (e.g., with associated probability/confidence values) the environmental agent may be present in.

Pre-processing the set of inputs can optionally additionally or alternatively include determining one or more classification labels associated with any or all of the set of environmental objects/agents, and further optionally a probability and/or confidence (as represented in a probability) associated with the classification label(s). The classification labels preferably correspond to a type of agent, such as, but not limited to: a vehicle (e.g., binary classification of a vehicle) and/or type of vehicle (e.g., sedan, truck, shuttle, bus, emergency vehicle, etc.); pedestrian; animal; inanimate object (e.g., obstacle in roadway, construction equipment, traffic cones, etc.); and/or any other types of agents. For example, inputs can be classified with a set of one or more classifiers (e.g., dynamic object classifiers, static object classifiers, etc.; binary classifiers, multi-class classifiers, etc.), but can additionally or alternatively be performed with any or all of: computer vision techniques, machine learning models, object segmentation techniques, point cloud clustering, neural networks (e.g., pretrained to identify a specific set of objects—such as cars or pedestrians-based on the sensor data inputs, etc.; convolutional neural network [CNN], fully convolutional network [FCN], etc.), object detectors/classifiers (e.g., You Only Look Once [YOLO] algorithm; non-neural net approaches such as Histogram of Oriented Gradients [HOG] and/or Scale-Invariant Feature Transform [SIFT] feature detectors, etc.), object trackers, and/or any other suitable processes.

The classification labels are preferably determined, at least in part, based on the geometric properties of the agent (e.g., size, profile, 2D hull, etc.) and any or all of the state estimates (e.g., velocity, position, etc.), but can additionally or alternatively be otherwise determined.

In variants, objects/agents are preferably uniquely identified/tracked in association with an object instance identifier (equivalently referred to herein as an object/agent ID), such that the object/agent can be individually identified and distinguished from others in the environment in the current timestep and the state history. However, agents can be otherwise suitably tracked/referenced across time steps, data frames, and/or election cycles.

In variants, objects can be identified, labeled (and/or re-labeled), and tracked as described in U.S. application Ser. No. 17/554,619, filed 17 Dec. 2021, titled "METHOD AND SYSTEM FOR DYNAMICALLY UPDATING AN ENVIRONMENTAL REPRESENTATION OF AN AUTONOMOUS AGENT", which is incorporated herein in its entirety by this reference; and/or the inputs can include the environmental representation (and/or tracking history) described therein.

The set of inputs (e.g., pre-processed set of inputs) is preferably represented in a set of vectors (e.g., a vector for each agent at each time step) for further processing in the method 200, but can additionally or alternatively be presented in matrices and/or other data structures.

S100 can additionally or alternatively include any other processes.

4.2 Method—Determining a Set of Policies Based on the Set of Inputs S200

The method 200 includes determining a set of policies based on the set of inputs S200, which functions to determine which policies are available to the environmental objects/agents—and optionally to the ego agent—such that optimal (e.g., most feasible) policies can be selected for any or all of these objects and agents. Additionally or alternatively, S200 can function to eliminate policies from consideration, prioritize policies, apply various weights to any or all of the set of policies, and/or perform any other functions.

A policy preferably refers to a driving behavior (e.g., maintaining a lane, turning right, turning left, changing lanes, stopping, accelerating, decelerating, etc.) and/or can optionally prescribe (or serve as a reference for) control commands which are configured to implement or simulate the driving behavior (e.g., along a particular path or reference trajectory for the agent). For example, a policy of an agent in the environment can include or be associated with a deterministic controller which targets a reference trajectory of the policy (e.g., to facilitate forward simulation based on the state of the agent). As a second example, a policy of an agent in the environment can be used to model and/or simulate a particular driving intention/behavior (e.g., maintaining a lane, turning right, turning left, changing lanes, stopping, accelerating, decelerating, etc.). Additionally or alternatively, a policy can include and/or refer to any other information.

S200 is preferably performed in response to and based on S100, but can additionally or alternatively be performed multiple times during the method 200, prior to S100 (e.g., in use cases where the policies considered for each agent are predetermined and/or constant), in response to other processes of the method 200 (e.g., in response to determining the set of scores in S300), in response to a trigger, and/or at any other times.

S200 preferably includes determining a set of environmental policies for environmental agents based on the set of inputs S210, which functions to determine the set of environmental policies for the system to consider for intention estimation of the environmental agents in simulations (e.g., forward simulations as described below, etc.). Additionally or alternatively, S200 can include determining a set of ego policies for the ego agent based on the set of inputs S220 (e.g., to implement in said simulations and/or include determining any other policies; to be used in policy evaluation according to S400).

The policies (e.g., environmental policies, ego policies, etc.) are preferably determined based on any or all of the set of inputs, such as the pre-processed set of inputs (e.g., state estimates, position, velocity, heading angle, class label, geometry, etc.) described above. Policies are preferably determined for each individual agent in the environment (e.g., in association with a particular environmental agent instance ID), but can additionally or alternatively be determined based on the classification (e.g., for each dynamic/mobile object; etc.), and/or can be otherwise determined. Additionally or alternatively, the policies can be determined based on any other information, such as a map (e.g., which prescribes a set of available policies based on the agent's location within the map), database, and/or any other tools. As an example, the policies can include (or be associated with) a reference trajectory extracted from a predetermined (prior) vehicle route network (e.g., with a map stored in a local memory onboard the autonomous vehicle; etc.). Policies can be selected/extracted from a predetermined set of policies, dynamically generated using a vehicle route network, dynamically curated (e.g., based on a class label of the agent; based on an instantaneous state or state history; based on a map; etc.), and/or can be otherwise determined.

In some variations, for instance, S200 includes filtering (e.g., removing, eliminating from further consideration, down-weighting, etc.) policies from the total set of all available policies to a particular agent based on the class label options attributed to the agent. For instance, if it is determined that there is no possibility that a particular agent is a pedestrian, then policies exclusive to pedestrians (e.g., walking on the sidewalk) can be eliminated from further consideration. In additional or alternative variations, S200 includes filtering policies from the total set of all available policies to a particular agent based on a position of the agent. For instance, if an agent is located in a right turn lane, a policy prescribing a left turn can be eliminated from further consideration. However, additionally or alternatively, the same policies can be considered for all agents and/or the policies can be otherwise suitably determined.

As an example, a policy prescribing a right turn or lane change right can be considered for a vehicle in a left turn lane. As a second example, unconventional, extra-legal, and/or unlawful driving maneuvers can be considered as available policies for agents in the environment, which may improve intention estimation robustness in edge and corner case environmental scenarios.

S200 can optionally include determining a set of possible routes associated with each environmental agent, wherein each policy can be associated with (e.g., paired with, include, etc.) one or more possible routes. The possible routes preferably represent potential trajectories of the environmental agent and can be determined based on any or all of: the potential policy for the environmental agent, a current and/or past policy determined for the environmental agent, a road network and/or set of maps (e.g., depicting the locations of lane lines, traffic signals, infrastructure, etc.; depicting the directions of traffic; etc.), and/or any other information.

The possible (candidate) routes can be any or all of: distance-bounded, such as extending for a predetermined distance (e.g., between 100 and 500 meters, 100 meters, 200 meters, 300 meters, 400 meters, 500 meters, between 500 and 1000 meters, greater than 1000 meters, etc.); time-bounded, such as extending as far as the environmental agent can travel in a predetermined threshold of time (e.g., between 5 and 30 seconds, less than 5 seconds, greater than 30 seconds, etc.); otherwise bounded; unbounded; and/or any combination.

In a preferred set of variations, each potential policy (a.k.a., candidate policy) for the environmental agent is paired with all possible routes that the environmental agent could take in accordance with that policy, where each of these policy-route pairs is preferably considered in the subsequent processes of the method 200.

S200 can optionally include determining a set of potential ego policies (a.k.a., candidate ego policies) for the ego agent based on the set of inputs S220, which functions to determine which ego policies the ego agent should consider in implementing. Each of these (and/or a prioritized subset) is preferably evaluated as described below (e.g., in an MPDM module). The potential ego policies can be any or all of: determined in a same or similar way as described above for the environmental policies, in a different way as those described above for the environmental policies, based on a goal associated with the ego agent (e.g., progress toward a destination), and/or in any other ways. The ego policies can optionally be associated with a set of potential routes (e.g., to form policy-route pairs as described above). Likewise, policies for the ego agent and environmental agents can be the same (e.g., a set of high-level vehicle behaviors common to all agents in the environment), substantially similar, and/or different. For example, additional policies may be available to agents in the environment (e.g., different policies may be available to a pedestrian than to the autonomous agent; the autonomous agent may not consider some policies—such as speeding past a stop sign—which may be considered when estimating intent and/or evaluating policy feasibility for other vehicles in the environment). However, any other suitable policies can be determined.

In a first variation, S200 includes determining a set of policy-route pairs for each of the environmental agents tracked by the ego agent, where the set of policy-route pairs includes each of a set of policies available to the environmental agent (e.g., as determined based on class labels associated with the environmental agent, as determined based on geometric information associated with the environmental agent, as determined based on state estimates associated with the environmental agent, as determined based on a road network associated with the environmental agent, as determined with a predetermined list, etc.), and optionally determining a set of ego policies (and/or ego policy-route pairs) available for consideration.

In a first set of specific examples, the set of policies available to the environmental agent are filtered based on any or all of the set of inputs (and/or pre-processed inputs) determined in S100, such as but not limited to: the class label(s) available to the agent, the location of the agent (e.g., in comparison with a map prescribing sets of policies based on location), the geometry of the agent (e.g., and which lanes the agent might be in), other state information of the agent (e.g., which direction(s) the agent is heading based on a heading angle), and/or any other information.

In a second set of specific examples, all available policies are considered for each agent.

S200 can additionally or alternatively include any other suitable processes.

4.3 Method—Determining a Set of Scores Associated with the Set of Environmental Policies S300

The method 200 includes determining a set of scores associated with the set of environmental policies, which functions to enable assessment of the set of environmental policies with respect to at least a feasibility associated with an environmental agent executing a certain policy (and/or policy-route pair), and optionally with respect to any other criteria. This preferably ultimately functions to enable an optimal policy for the ego agent to be selected and implemented (e.g., in subsequent processes of the method 200), such that the scores associated with the environmental policies are taken into consideration and/or otherwise used to influence this decision-making process. Additionally or alternatively, S300 can perform any other suitable functions.

The set of scores is preferably at least partially determined with a set of forward simulations, which collectively function to simulate the predicted outcomes of the agent(s) executing different policy options (e.g., policy-route pairs). Additionally or alternatively, S300 can include performing backward simulations, a combination of simulations, any other simulations, and/or in absence of simulations. In a specific example, S300 simulates policies for each environmental agent (e.g., in isolation relative to other agents in the environment) individually. However, scores can be otherwise determined.

The score associated with an environmental policy preferably corresponds to a probability of that (candidate) policy being implemented by the environmental agent, which is effectively integrated into a weight associated with that policy and/or policy-route pair. Alternatively, the score can correspond to an error associated with the policy being implemented, a likelihood that a candidate policy represents the intention of an agent, and/or include any other types of metric(s).

In variants, S300 can include: determining a feasibility score associated with each policy S310; optionally determining a historical score associated with each policy S320; optionally determining a prior(s) score associated with each policy S330; and/or any other suitable sub-steps/elements.

Figure 7:
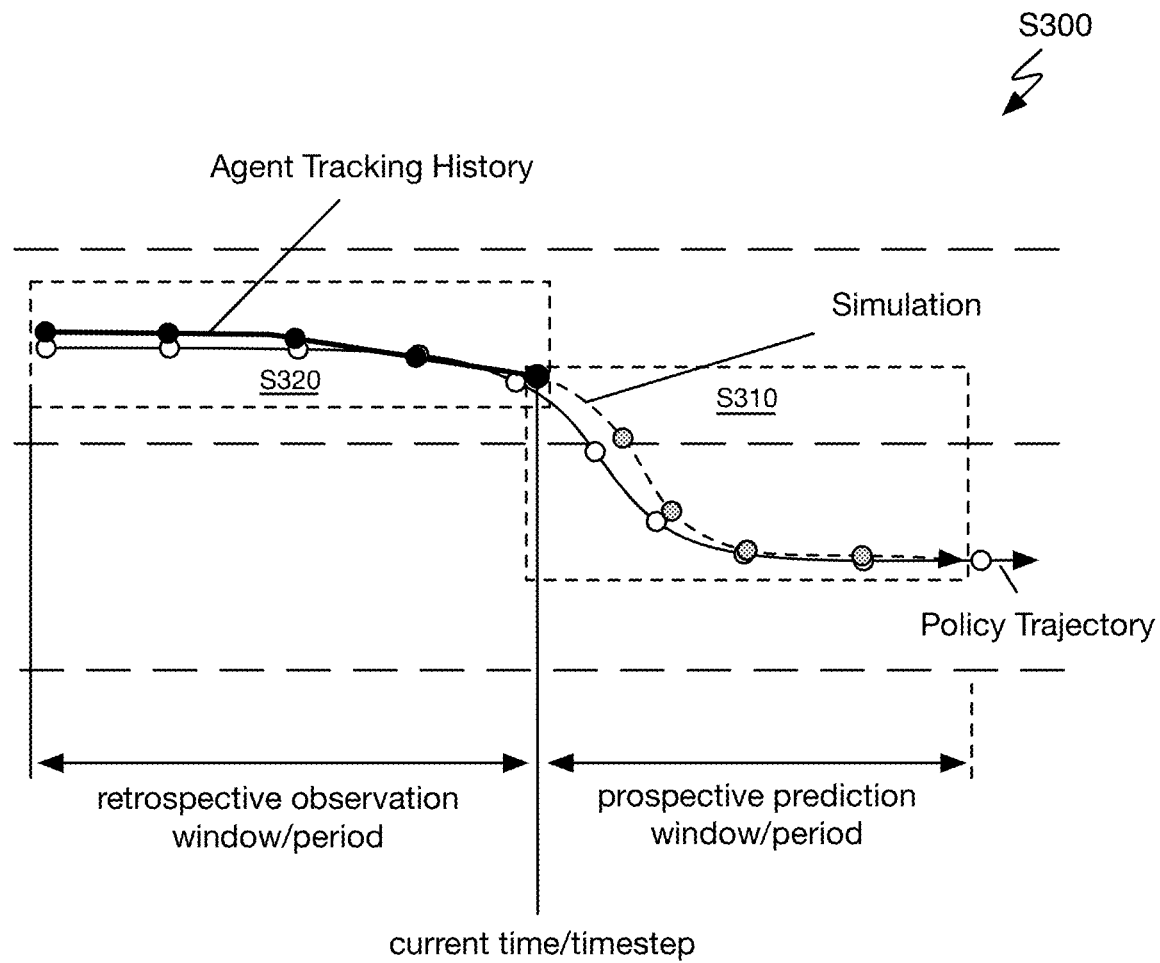
FIG. 7 is a diagrammatic representation of an example of policy scoring for a variant of the method.

Determining a feasibility score (equivalently referred to herein as a future feasibility score) associated with each environmental policy S310, functions to determine the feasibility of the environmental agent executing that environmental policy. The feasibility score is preferably determined based on the trajectory of the environmental agent which results from simulating a particular environmental policy and/or environmental policy-route pair (e.g., as described above). This trajectory can then be analyzed to see if and/or to what degree it aligns with a reasonable/feasible trajectory for an agent taking that route. For instance, if simulating a policy-route pair results in the simulated environmental agent drifting off the road (e.g., driving off the road in order to make a sudden turn according to a turn policy) or otherwise driving in an unexpected and/or infeasible manner in order to conform to the policy and/or paired its route (e.g., colliding into another agent or infrastructure, accelerating/decelerating in an extreme manner, driving backward and/or in an otherwise unexpected direction, etc.), a low feasibility score can be determined for that particular agent and policy (and/or policy-route pair). As a second example, the feasibility score can be a characterization of a (predicted) control effort parameter(s), such as throttle/acceleration, braking/deceleration, and/or steering adjustments, to achieve the simulated trajectory over a prospective prediction period (e.g., planning horizon, for a distance of the simulation, etc.; an example is shown in FIG. 7). As an example, a policy which yields control inputs which exceed the physical and/or dynamic limitations of an environmental agent (e.g., exceed a level of braking considered feasible for an average agent of that class type, exceed a level of steering considered feasible for an average agent of that class type, etc.) may be considered infeasible.

The feasibility score is preferably determined based on one or more feasibility parameters, which function to quantify the feasibility associated with executing the particular policy (and/or policy-route pair). Feasibility parameters can include: control effort parameters (e.g., lateral control parameters, longitudinal control parameters, etc.), a geographic parameter(s), an error accumulation parameter(s), reference trajectory deviation parameter(s) (and/or a derivative/rate thereof), lateral parameters, longitudinal parameters, spatiotemporal parameters, ride quality parameters, risk estimation parameters, vehicle wear parameters, position parameters (e.g., distance to other agents, distance to infrastructure objects, etc.), motion parameters of the agent (e.g., maximum velocity, minimum velocity, change in velocity, maximum acceleration, change in acceleration, etc.), orientation parameters of the agent (e.g., change in heading angle, reversal in agent direction of travel, etc.), and/or any other suitable parameters. In a preferred set of variations, for vehicle agents, the feasibility parameter(s) includes one or more geographic parameters which indicate how much the agent may be predicted to deviate from a reference trajectory associated with the policy. In preferred specific examples, for instance, the feasibility parameter includes a lateral error with respect to the centerline of the lane that the agent is traveling in (and/or a threshold lateral range therefrom, such as a lane width/boundary), such that the larger the lateral error (indicating drift of the agent in executing a policy and/or policy-route pair), the lower the feasibility (score) of the policy selection. Further additionally or alternatively, any or all of the feasibility parameters can take into account a goal (e.g., a predicted goal) for the environmental agent, such as, but not limited to: progress toward a known or predicted destination, safety, obeyance of traffic rules, and/or any other goals. The goal(s) can be unique to individual environmental agents, shared among any number of agents (e.g., among all vehicle agents, among all pedestrian agents, etc.), and/or any combination.

The feasibility parameters are preferably determined based on forward simulations of the environmental agents, where the simulations are performed based on at least a current set of inputs associated with the environmental agents (e.g., current state estimate and/or current class label, for each agent ID, etc.), but can additionally or alternatively be performed with historical information associated with the environmental agents (e.g., historical state estimates and class labels up to a predetermined time before the current time, all historical state estimates and class labels for the agent(s), etc.), and/or with any other simulations (e.g., backward simulations).

The simulation preferably produces a single (future) feasibility score for the environmental policy, however each simulation can additionally or alternatively produce multiple feasibility scores for each environmental agent and associated policy, where each of the multiple feasibility scores is associated with a particular time step in the forward simulation (e.g., each i-second increment in a 4 second simulation, which may enable feasibility to be assessed in a granular fashion and/or over multiple prospective horizons).

In a first set of variants, the feasibility score can be determined in S310 based on the predicted control effort (e.g., total, maximum instantaneous effort, etc.) for a forward simulation of an environmental policy. Predicted control effort may advantageously be utilized to avoid over-weighting the integral effects of small actuation errors over time (e.g., where small deviations from the reference trajectory may not meaningfully influence the net behavior of the vehicle; for example a small heading difference and turning radius difference during a cornering maneuver may result in a relatively large combined lateral and/or longitudinal error accumulation, but can have minimal effect to the resulting vehicle behavior and control inputs). For example, where the environmental policy can include or be associated with a particular controller (e.g., modeling vehicle behavior which attempts to track the intended route fragment; such as a PID controller for throttle, braking, and steering or, conversely, heading and net acceleration), the control effort can be the output of the controller as it attempts to track the trajectory given the current vehicle state. The control effort parameters can include a lateral effort parameter (e.g., heading/steering adjustments), a longitudinal control parameter (e.g., throttle/braking; net acceleration or velocity changes), and/or aggregate control parameters (e.g., heuristic function combining lateral and longitudinal parameters, etc.). As an example, a deterministic controller (e.g., a feedback controller) may produce a deterministic output of the control effort parameters for the forward simulation (e.g., where the forward simulation occurs independently of other agents). As such, the feasibility scoring may be considered a feedforward feasibility estimate and/or a feedforward simulation (e.g., as it may be independent of other external factors), however it is understood that this simulation can additionally or alternatively be considered a feedback simulation, as it may rely on a feedback controller based on the simulated performance (and/or may utilize feedback terms in the simulation), and/or can be otherwise suitably referenced (e.g., as a forward simulation). In a specific example, the feasibility score can be a feedforward estimate of predicted control effort over a reference trajectory (e.g., for a predetermined distance and/or time, etc.).

In a second set of variants, the feasibility score can be determined in S310 based on a lateral error accumulation (e.g., with respect to the lane centerline) over the predicted rollout (e.g., vehicle motion in the forward simulation), but can additionally or alternatively be determined based on a time-derivative of the lateral error accumulation (e.g., lateral error accumulation rate relative to time), time-derivative of total error accumulation (e.g., longitudinal and/or lateral error), and/or any other suitable error/deviation accumulation. For example, the feasibility score and/or likelihood of policy intent can be estimated as using the Mahalanobis distance between the predicted trajectory and the reference trajectory for the policy. As a second example, the feasibility score can be estimated based on the Euclidean distance between trajectories (e.g., time-derivative of Euclidean distance as a function of time, etc.).

In a third set of variations, S310 includes calculating, for each simulation, a feasibility score at each time step for each environmental policy (and/or policy-route pair) selected for each environmental agent. In a first set of specific examples, the simulations are performed only based on a current set of inputs associated with the environmental agents, such as current (and/or the most recent) state estimates for each environmental agent, current class labels for each environmental agent, and/or any other information. In a second set of specific examples, the simulations are performed based on the current set of inputs as well as historical information associated with the environmental agents (e.g., information from a predetermined time period prior to the current time period).

The feasibility score can be determined for a prospective (future) time period, over which the agent motion is predicted/simulated, which can be a predetermined prospective prediction period (e.g., 3 seconds, 5 seconds, etc.), a period associated with a predetermined traversal distance (e.g., loom), a dynamically sized window (e.g., as a function of speed, context, etc.), and/or any other suitable time period or prediction window.

However, any other suitable (future) feasibility score can be determined.

S300 can optionally additionally include determining a historical score associated with each policy S320, which functions to determine how closely, for each tracked environmental agent, the potential policy aligns with the prior driving behavior of the environmental agent. This can indicate, for instance, how likely it is that an environmental agent will execute a certain policy based on how it was driving previously. For instance, if an environmental agent has been significantly accelerating from a normal speed for its prior history, it may be more likely that the agent is driving straight or trying to change lanes rather than preparing for a turn. In preferred variations, S320 is performed when S310 is calculated based only on the current set of inputs (rather than historical information), where the historical and future scores are calculated separately and then aggregated (e.g., as described below). Additionally or alternatively, S320 can be performed with any version of S310, S300 can be performed in absence of S320, and/or the method 200 can be otherwise suitably performed.

In a preferred set of variations, S320 is performed for a predetermined time period in the past, such as a predetermined number of seconds (e.g., between 1 and 10 seconds, between 1 and 5 seconds, between 2 and 6 seconds, between 5 and 10 seconds, greater than 10 seconds, etc.), which can function to reduce computational load associated with the processing of each policy, only focus on the most relevant recent driving behavior, and/or confer any other benefits.

Figure 5:
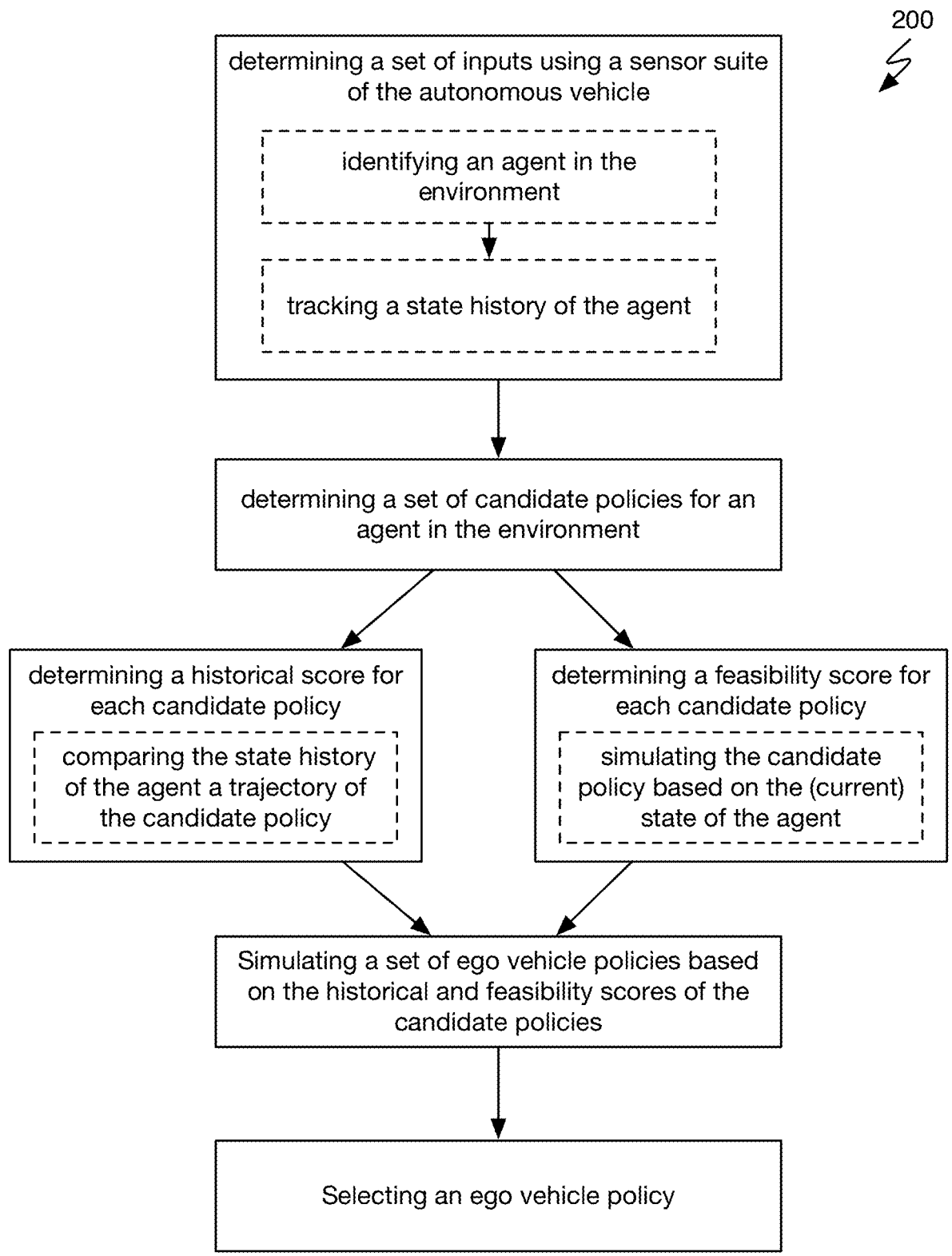
FIG. 5 is a flowchart diagrammatic example of a variant of the method.

The historical score can be determined from a direct comparison of observed, historical vehicle states (e.g., past vehicle trajectory/motion) to the reference trajectory associated with the policy (e.g., an example is shown in FIG. 5). The historical score can be determined by a set of heuristics, a scoring function, a statistical comparison, a set of vector comparisons (e.g., spatial, spatiotemporal; Mahalanobis distance), and/or any other suitable matching/comparison techniques based on the observed historical vehicle states. Alternatively, the historical score can be evaluated as the difference in (estimated) historical control effort through the observed/retrospective state history and the control effort associated with the reference trajectory. For example, if the policy has a historical reference trajectory which is straight and includes no changes in vehicle actuation/control (i.e., proceed straight while maintaining speed/throttle), observed angular/linear accelerations, associated with steering and/or braking/throttle changes, may indicate that the policy does not closely match the past observations and/or state history, yielding a lower historical score/feasibility.

The historical score is preferably determined separately from the (future) feasibility score, but can alternatively be aggregated and/or combined with the future feasibility score, integrated into the feasibility score determination, and/or otherwise determined. Additionally or alternatively, any or all of this historical information can be taken into account in S310, not taken into account in S300, and/or any combination thereof.

Figure 8:
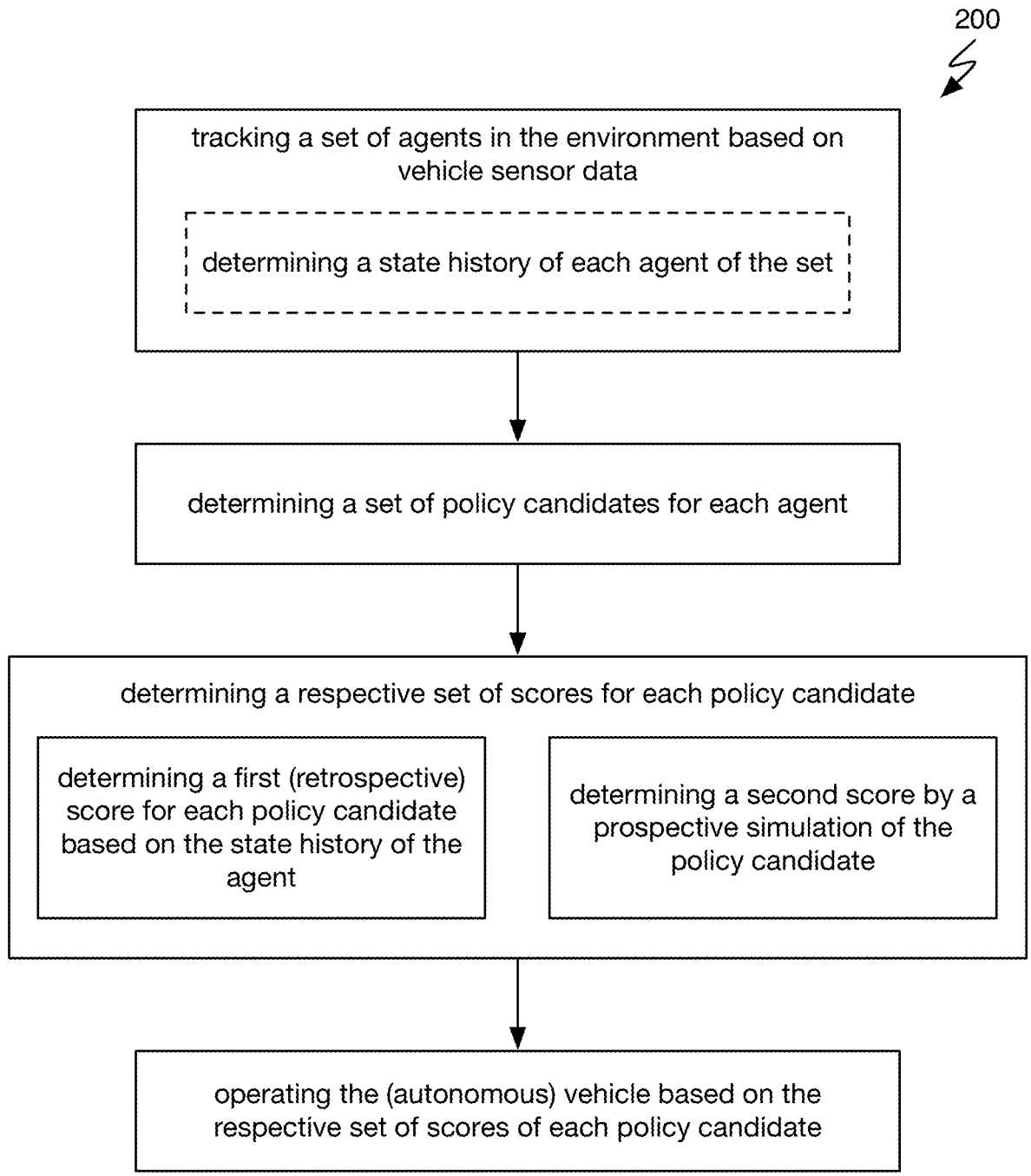
FIG. 8 is a flowchart diagrammatic example of a variant of the method.

In one set of variants, an example of which is shown in FIG. 8, determining a respective set of scores for each policy candidate can include: determining a first (retrospective) score (e.g., historical score) based on a comparison between the policy candidate and the state history of the agent; and determining a second score (e.g., feasibility score) by a prospective simulation of the policy candidate.

S300 can optionally additionally or alternatively include determining a prior(s) score, which functions to take into account another probability(ies) (e.g., confidence values) associated with the simulations and determined, at least in part, based on the set of inputs (and/or the pre-processed set of inputs). For instance, in determining a class label (e.g., pedestrian, motorized vehicle, bicycle, etc.) for an agent, the class label can include multiple class labels with associated probabilities (e.g., 95% probability that the agent is a motorized vehicle and 5% probability that the agent is a pedestrian). Therefore, if one of the possible policies is a policy exclusive to a motorized vehicle, the probability that the agent is a motorized vehicle can be taken into account when determining an overall score in S300. The prior(s) score can additionally or alternatively take into account how probable it is that the agent is located within a particular lane and/or any other confidence values associated with the set of inputs.

In some variants, a prior(s) score can be used to weight/prioritize policies based on prior established relative probabilities, such as may be predetermined for the agent class or roadway context. For instance, a prior(s) score may be used to encode a probability/likelihood associated with various roadway maneuvers (e.g., such as running a stop sign). As an example, the probability of roadway agents stopping at a stop sign, in observation of roadway regulations, may generally be very high (e.g., greater than 99%), and may be greater than the probability of the agent running through the stop sign (e.g., less than 1%). Accordingly, even in cases where both of these policies may have high historical scores (e.g., as may inherently be the case before a vehicle would normally brake) and high prospective feasibility, it may be advantageous to rely on a prior(s) score to prioritize the more likely of the two policies, thereby relying on prior information/context to determine that the agent likely intends to stop at the stop sign. As a second example, the probability of agents of an automobile class executing a policy to stop at a stop sign may be greater than the probability of agents of a cyclist class executing the same policy. Accordingly, prior(s) scores/weights may be used to score policies in S300 based on the prior information/context.

The prior(s) score can be dynamically determined for each agent based on any suitable information/inputs received during S100 (e.g., classification label/probability), can be predetermined for various policies, and/or can be otherwise determined. Alternatively, prior(s) scores can be otherwise implemented or otherwise not relied upon.

Figure 6:
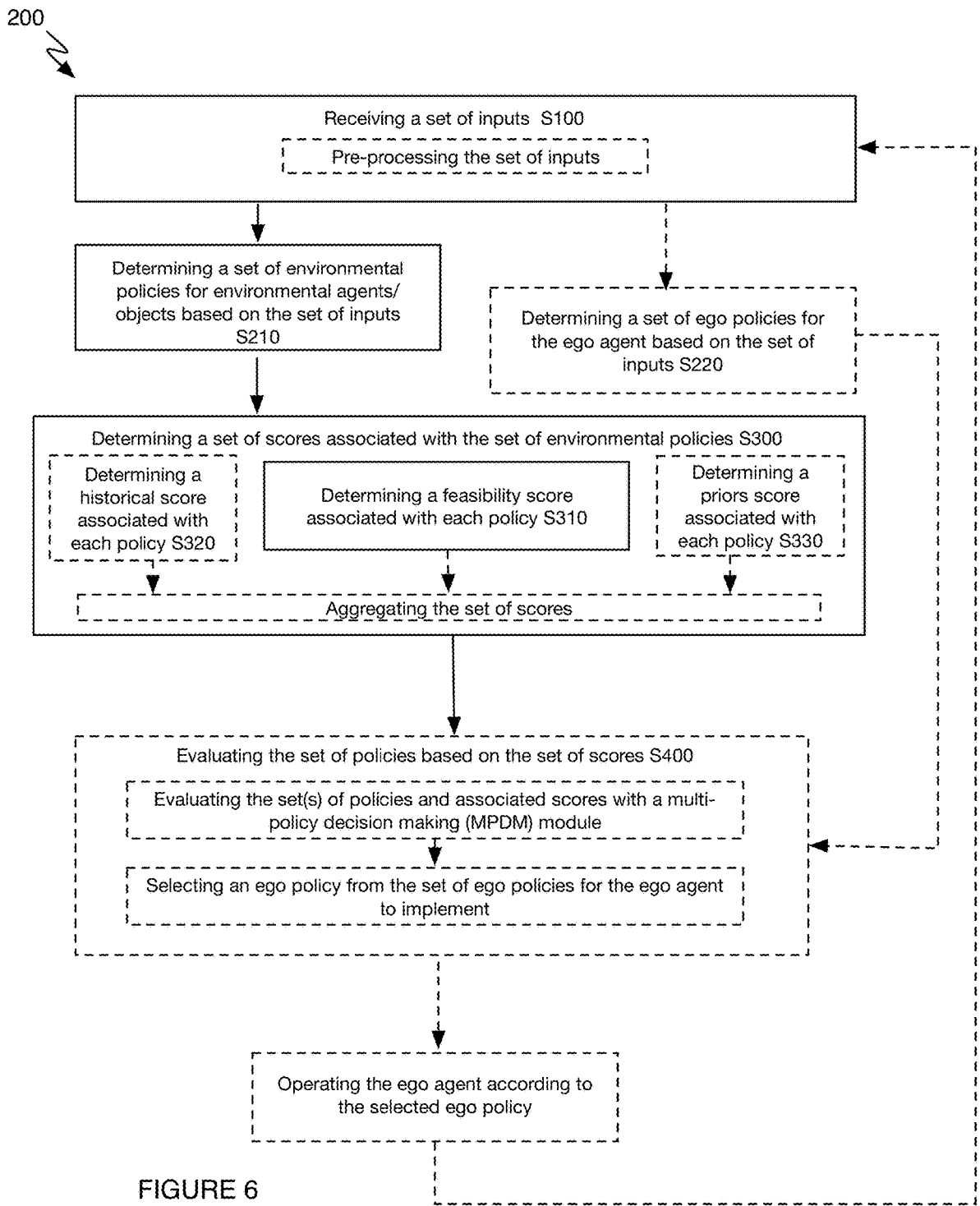
FIG. 6 is a schematic of a variant of the method.

S300 can optionally additionally or alternatively include calculating any other scores or combination of scores for use in evaluating the set of policies. S300 can optionally include aggregating (e.g., multiplying, averaging, calculating a median, etc.) any or all of the scores calculated in S300, such as aggregating any or all of: a future feasibility score, a historical score, and a prior(s) scores (e.g., an example is shown in FIG. 6). Alternatively, a single score can be calculated in S300, scores can be evaluated independently in subsequent processes of the method 200, and/or the score(s) can be otherwise determined.

Figure 4A:
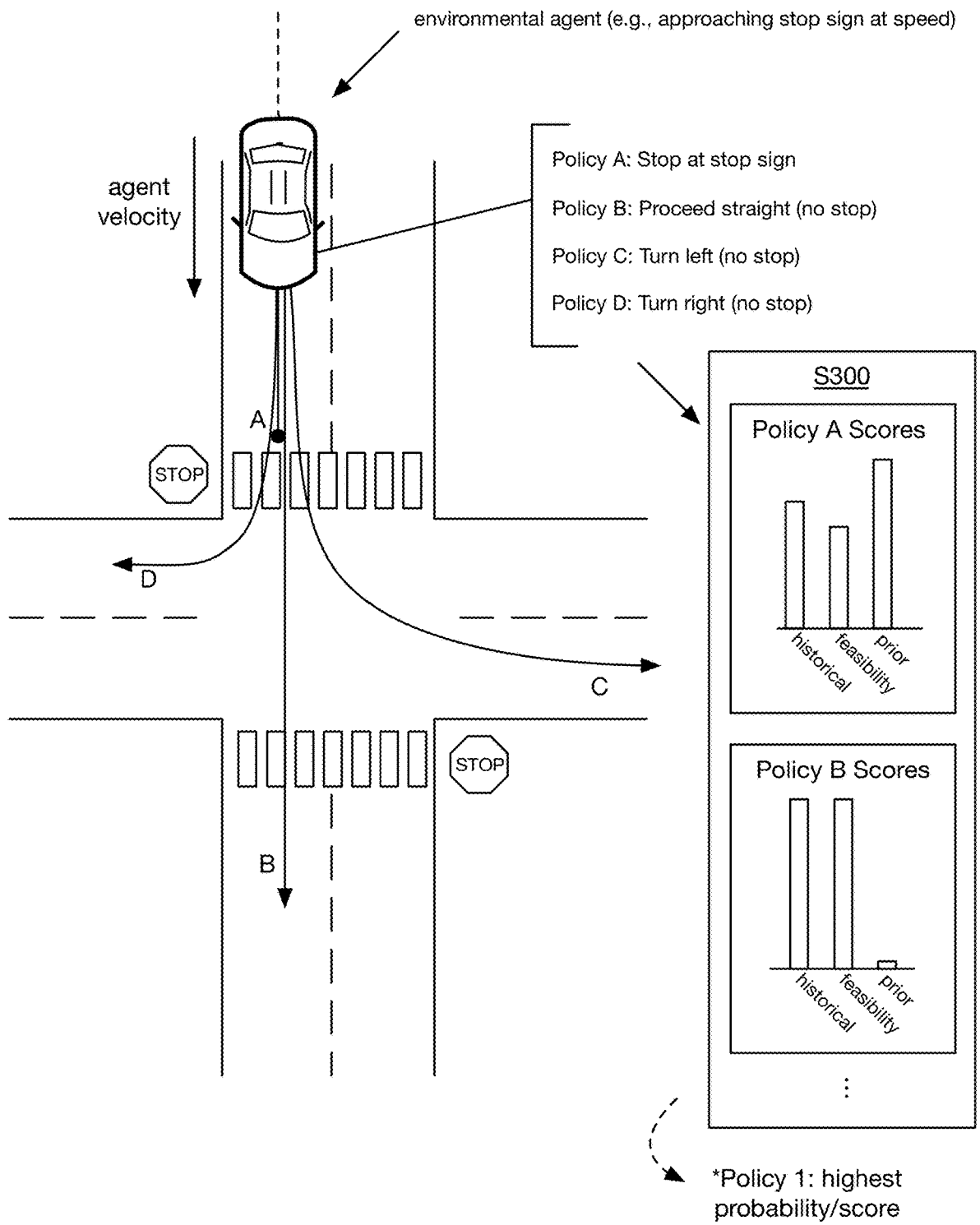
FIGS. 4A-4E are example schematics of a variant of the method, illustrating policy scoring of an agent in an environment.
Figure 4B:
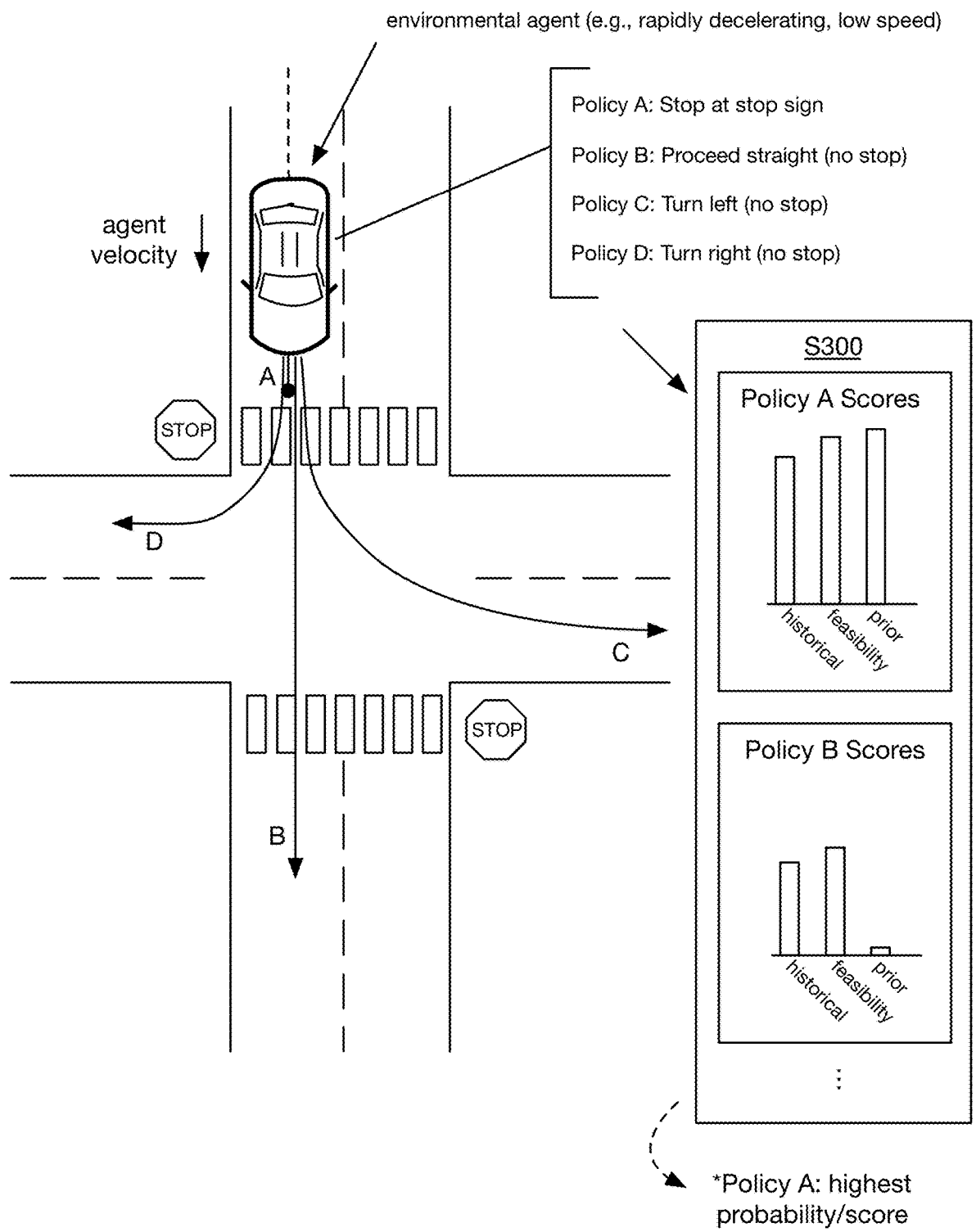
Figure 4C:
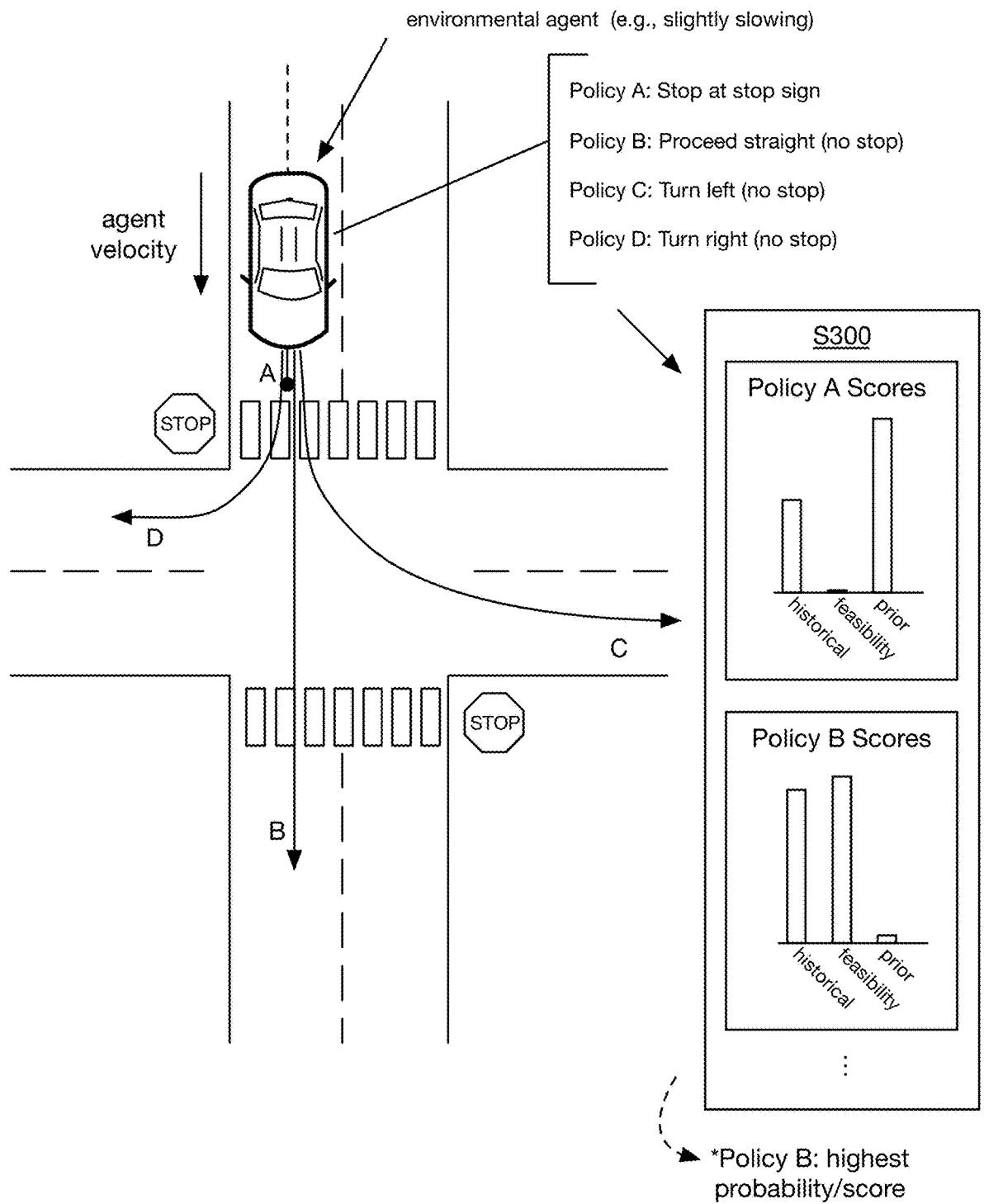
Figure 4D:
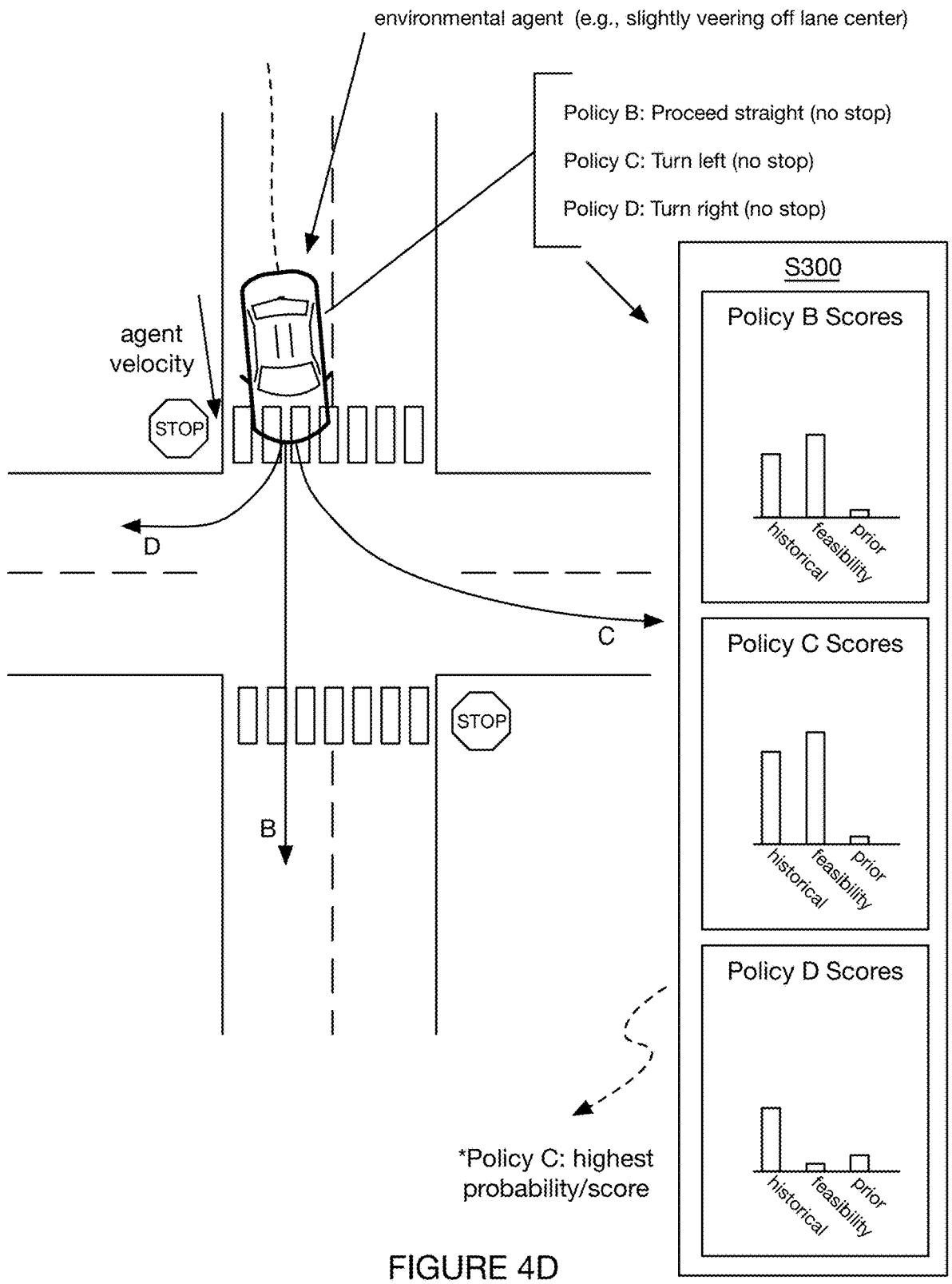
Figure 4E:
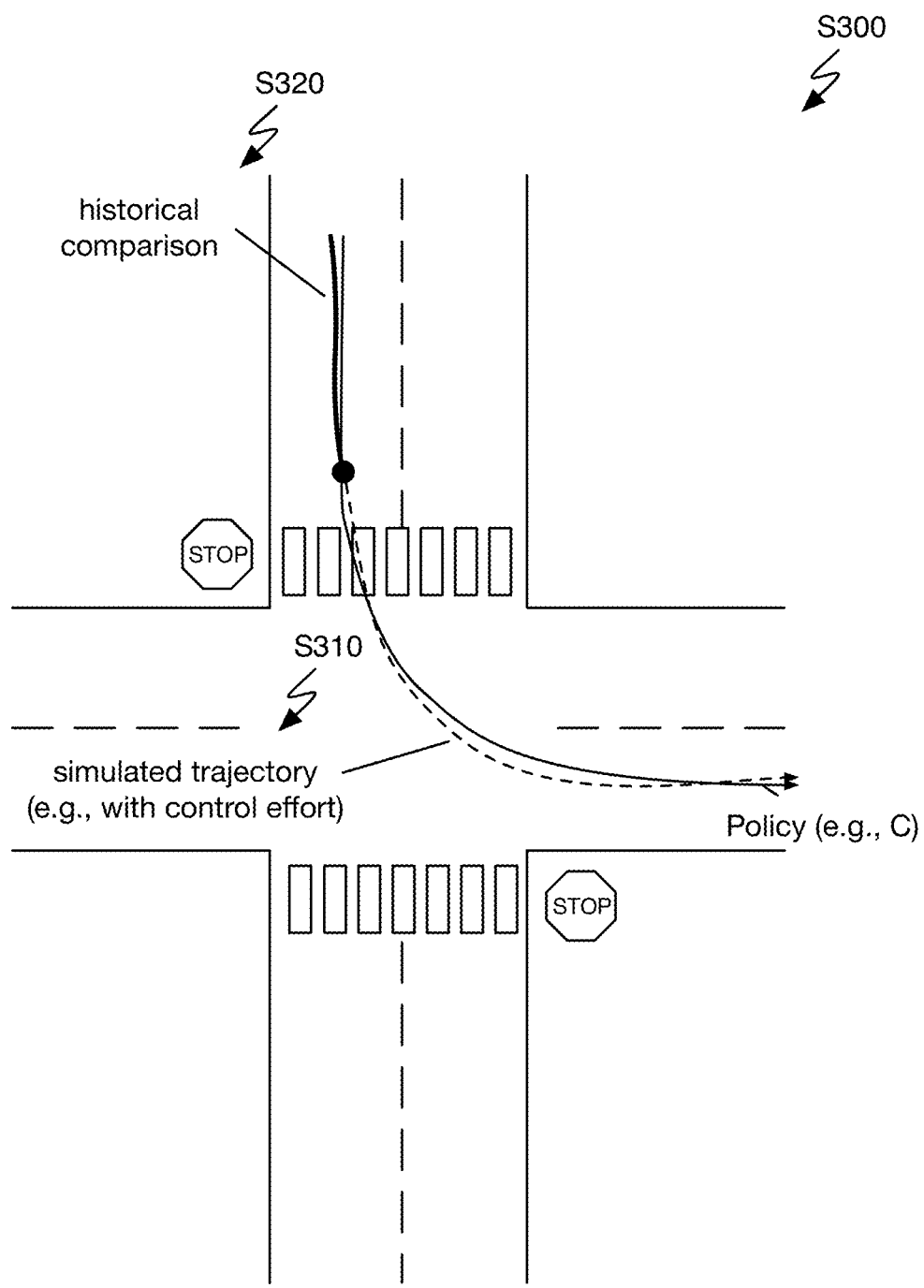

In a first set of illustrative examples, a set of candidate policies may be determined in S200 for an agent approaching an intersection with a stop sign, which include: stopping at the stop sign, turning right without stopping, turning left without stopping, and proceeding straight without stopping;

S300 can generate a historical score, a feasibility score, and an optional prior(s) score for each policy. In some cases, each of these policies may correspond to a high feasibility score, an example of which is shown in FIG. 4A, as the vehicle may feasibly be controlled to execute each of them. The prior(s) score may indicate that stopping at the stop sign is the highest probability policy and/or all potential policies may be considered, based on their respective scores, during ego planning. If the environmental agent slows rapidly as it approaches the intersection (e.g., an example is shown in FIG. 4B), the feasibility score associated with the policy of stopping at the stop sign may indeed indicate that this policy is the most feasible. If instead the agent maintains course at a high velocity, an example of which is shown in FIG. 4C, stopping may become infeasible and another policy may have the highest probability/score (e.g., indicating that the vehicle intends to proceed through the intersection without stopping). If the environmental agent veers off center as it approaches the intersection, an example of which is shown in FIG. 4D, the feasibility and/or historical scores can indicate that the highest probability policy is that the vehicle is turning (e.g., based on the simulated trajectory and/or comparison of the state history, an example of which is as illustrated in FIG. 4E). In this set of examples, each policy and/or a subset of the policies can be evaluated in S400 and/or S500 for ego vehicle planning and control during each timestep, based on the respective scores.

4.3 Method—Evaluating the Set of Policies Based on the Set of Scores S400

The method 200 can optionally include evaluating the set of policies based on the set of scores S400, which functions to enable selection of an optimal policy for the ego agent to implement. Additionally or alternatively, S400 can perform any other suitable functions and/or the scores can be otherwise suitably evaluated.

S400 preferably includes selecting an optimal ego policy for the ego agent to implement, but can additionally or alternatively include assigning a most feasible policy to any or all of the set of environmental agents (e.g., based on an aggregated score calculated above), eliminating policies from consideration for the environmental agents (e.g., based on scores calculated in S300 falling below a threshold), and/or performing any other actions.

S400 is preferably performed based on the set of simulations performed in S300, where the set of simulations enable an overall ego score—such as a cost function and/or a loss function—to be calculated for each potential ego policy associated with the ego agent (in other words, each simulation), where the ego policy associated with the lowest cost function can be selected. Alternatively, S400 can be performed with an additional set of simulations (e.g., executed after the simulations of S300; by an MPDM) and/or any combination of simulations.

In a preferred set of variations, S400 is performed in accordance with an MPDM module, such as any or all of those described in U.S. application Ser. No. 16/514,624, filed 17 Jul. 2019, and U.S. application Ser. No. 17/365,538, filed 1 Jul. 2021, each of which is incorporated in its entirety by this reference. As an example, S300 can include a set of parallelized, independent feasibility simulations (e.g., analyzing feasibility of policies for each agent independently; which may be independent and/or separate from an ego vehicle policy) and S400 can include a plurality of joint scenario simulations (e.g., examining interactions between agents in the environment under a joint policy scenarios; which include an ego vehicle policy evaluation).

In variants, the ego policy can be selected based on a plurality of simulations for each of ego policy of the set, wherein each simulation evaluates an ego policy relative to an environmental scenario comprising a respective policy for each agent in the environment sampled from a respective set of environmental policies based on the scores.

In a first set of variants, S400 can include evaluating ego policies relative to the set of environmental policies, wherein the evaluation is weighted based on the aggregate score of each environmental policy of the set.

In a second set of variants, nonexclusive with the first set, S400 can include evaluating the set of ego policies by performing multiple simulations of each ego policy relative to the set of environmental policies based on the feasibility scores and the historical scores. In an example, evaluating the set of ego policies can include simulating vehicle policies based on environmental policy scenarios which are sampled from the set of environmental policies based on the aggregate scores.

Evaluating the set of policies based on the set of scores can include statistical evaluations, heuristic scoring, energy maximization (or cost minimization) techniques, decision trees, Bayesian optimization, ML-based evaluations, and/or any other suitable evaluations/selections. For example, an optimal policy can be selected using an MPDM system based on the set of scores for each policy generated during S300.

However, the set of policies can be otherwise evaluated and/or an ego vehicle policy can be otherwise suitably selected/determined.

4.4 Other Processes

The method 200 can optionally include any other processes, such as operating (e.g., controlling) the ego agent according to the selected ego policy S500, determining a trajectory for the ego agent based on the selected ego policy and/or operating the ego agent according to the trajectory, and/or any other processes. For example, the selected ego vehicle policy can be selected/elected and implemented by an autonomous vehicle controller of the computing system.

Although omitted for conciseness, the preferred embodiments include every combination and permutation of the various system components and the various method processes, wherein the method processes can be performed in any suitable order, sequentially or concurrently.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A method of operation of an autonomous vehicle in an environment, comprising:
    determining a set of inputs using a sensor suite of the autonomous vehicle, the set of inputs comprising an environmental agent instance identifier and a state history associated with the environmental agent instance identifier;
    based on the set of inputs, determining a set of multiple environmental policies for the environmental agent instance identifier;
    for each environmental policy of the set of multiple environmental policies:
        determining a historical score by comparing the state history associated with the environmental agent instance identifier to a reference trajectory associated with the environmental policy; and
        determining a feasibility score by a forward simulation of the environmental policy, wherein the forward simulation of each environmental policy comprises a closed-loop simulation for a deterministic controller associated with the environmental policy, wherein the feasibility score is determined based on a time-derivative of an accumulation of lateral error between the reference trajectory and the forward simulation; and
    aggregating the historical score and the feasibility score for each environmental policy of the set of multiple environmental policies into a respective aggregate score, wherein producing the respective aggregate score comprises multiplying the respective historical score and the respective feasibility score;
    determining an ego policy by evaluating a set of ego policies for the autonomous vehicle relative to the set of multiple environmental policies, based on the feasibility scores and the historical scores, wherein the evaluation of the set of ego policies relative to the set of multiple environmental policies is weighted based on the aggregate score of each environmental policy of the set of multiple environmental policies; and
    controlling driving of the autonomous vehicle based on the ego policy.

2. The method of claim 1, wherein evaluating the set of ego policies comprises simulating vehicle policies based on environmental policy scenarios which are sampled from the set of multiple environmental policies based on the aggregate scores.

3. The method of claim 1, wherein evaluating the set of ego policies comprises performing multiple simulations of each ego policy relative to the set of multiple environmental policies based on the feasibility scores and the historical scores.

4. The method of claim 1, wherein each feasibility score characterizes a predicted control effort associated with the forward simulation of the environmental policy.

5. The method of claim 4, wherein the predicted control effort comprises one or more of: a lateral control parameter and longitudinal control parameter.

6. The method of claim 1, wherein the set of inputs further comprises a classification associated with the environmental agent instance identifier, wherein the set of multiple environmental policies is based on the classification.

7. The method of claim 6, further comprising:
    determining a supplementary score for each environmental policy of the set of multiple environmental policies based on the classification and the state history, wherein the ego policy is determined based further on the supplementary scores.

8. The method of claim 1, wherein determining each environmental policy of the set of multiple environmental policies for the environmental agent instance identifier comprises extracting the respective reference trajectory from a prior route network.

9. A method for operation of an autonomous vehicle relative to agents in an environment of the autonomous vehicle, comprising:
    tracking a set of agents in the environment based on vehicle sensor data, comprising determining a state history of each agent of the set of agents;
    determining a set of multiple policy candidates for each agent, wherein each policy candidate comprises a closed-loop, deterministic controller;
    determining a respective set of scores for each policy candidate of the set of multiple policy candidates for each agent, comprising:
        determining a first score based on a comparison between the policy candidate and the state history of the agent;
        determining a second score by a forward simulation of the policy candidate,
            wherein the second score is determined based on a time-derivative of an accumulation of lateral error between the forward simulation and a reference trajectory associated with the policy candidate; and
        multiplying the first score and the second score to produce an aggregate score; and
    controlling driving of the autonomous vehicle based on the respective set of scores of each policy candidate of the set of multiple policy candidates for each agent.

10. The method of claim 9, further comprising:
    determining a classification of each agent of the set of agents, wherein the set of multiple policy candidates is determined based on the classification.

11. The method of claim 9, wherein operating the autonomous vehicle based on the respective set of scores of each policy candidate comprises: operating the autonomous vehicle based on a plurality of ego vehicle simulations.

12. The method of claim 11, wherein each ego vehicle simulation of the plurality is based on an environmental scenario comprising a policy selected for each agent of the set of agents in the environment, the policy for each agent selected from the set of multiple policy candidates for the respective agent based on the respective set of scores of each policy candidate.

13. The method of claim 11, wherein the forward simulation of each policy candidate is independent, wherein each ego vehicle simulation of the plurality comprises a combined simulation of the ego vehicle and each agent in the environment.

14. The method of claim 9, wherein the respective set of scores of each policy candidate collectively characterizes a respective policy likelihood across both a retrospective observation period and a prospective prediction period.

15. The method of claim 14, wherein each first score characterizes a historical comparison over the retrospective observation period, wherein each second score characterizes a predicted feasibility over the prospective prediction period.

16. The method of claim 15, wherein the prospective prediction period is associated with a predetermined traversal distance or a predetermined time period.

17. The method of claim 9, further comprising: using a multi-policy decision-making (MPDM) system, determining an ego policy for the autonomous vehicle based on the respective set of scores of each policy candidate of the set of multiple policy candidates for each agent, wherein operating the autonomous vehicle comprises executing the ego policy.

18. The method of claim 1, wherein the lateral error is determined with respect to a lane centerline.

* * * * *